United States Patent
Fiorese et al.

(10) Patent No.: US 10,785,634 B1
(45) Date of Patent: Sep. 22, 2020

(54) METHOD FOR END-TO-END (E2E) USER EQUIPMENT (UE) TRAJECTORY NETWORK AUTOMATION BASED ON FUTURE UE LOCATION

(71) Applicant: Telefonaktiebolaget LM Ericsson (publ), Stockholm (SE)

(72) Inventors: Virgilio Fiorese, McKinney, TX (US); Saulo Almeida Montenegro de Sa, New Brunswick, NJ (US); Rakesh Bajpai, New Delhi (IN); Vinicius Samuel Landi Fiorese, São Paulo (BR); Tushar Sabharwal, Delhi (IN); Nipun Sharma, New Delhi (IN); Rohit Shukla, Uttar Pradesh (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/297,423

(22) Filed: Mar. 8, 2019

(51) Int. Cl.
*H04W 8/08* (2009.01)
*G06N 5/04* (2006.01)
*H04W 64/00* (2009.01)

(52) U.S. Cl.
CPC .............. *H04W 8/08* (2013.01); *G06N 5/046* (2013.01); *H04W 64/006* (2013.01)

(58) Field of Classification Search
CPC ....... H04W 8/08; H04W 64/006; G06N 5/046
(Continued)

(56) References Cited

U.S. PATENT DOCUMENTS 6,385,454 B1  5/2002  Bahl et al.
6,750,813 B2  6/2004  Vargas-Hurlston et al.
(Continued)

FOREIGN PATENT DOCUMENTS

WO  2018171941 A1  9/2018

OTHER PUBLICATIONS

Author Unknown, "Technical Specification Group Services and Systems Aspects; Study of Enablers for Network Automation for 5G (Release 16)," 3GPP TR 23/791, Version 1.0.0, Sep. 2018, 3GPP Organizational Partners, 66 pages.
Author Unknown, "Technical Specification Group Services and Systems Aspects; Procedures for the 5G System; Stage 2 (Release 15)," 3GPP TS 23.502, Version 15.3.0, Sep. 2018, 3GPP Organizational Partners, 330 pages.
(Continued)

*Primary Examiner* — Mong-Thuy T Tran
(74) *Attorney, Agent, or Firm* — Withrow & Terranova, PLLC

(57) ABSTRACT

Methods and systems for End-to-End (E2E) User Equipment (UE) trajectory network automation are herein provided. According to one aspect, a network node for E2E UE trajectory network automation, such as a Network Data Analytics Function (NWDAF), receives, from a requesting entity, information identifying a future E2E UE trajectory, the E2E UE trajectory comprising a start location, an end location, and zero or more intermediate locations between the start location and the end location; calculates a E2E mobility trajectory prediction for the identified future E2E UE trajectory; and sends, to the requesting entity, the calculated E2E mobility trajectory prediction. The requesting entity may be a trusted entity or an untrusted entity, such as a Third Party Provider (3PP) outside of the trusted domain of the network. If the requesting entity selects a mobility trajectory, the network node sends mobility management and optimization information to a Radio Access Network node.

26 Claims, 19 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 9,088,859 | B2 | 7/2015 | Egner et al. |
| 9,107,132 | B2 | 8/2015 | Kowshik et al. |
| 9,267,805 | B2 | 2/2016 | Marti et al. |
| 9,303,997 | B2 | 4/2016 | McGavran et al. |
| 9,380,487 | B2 | 6/2016 | Shafiee et al. |
| 9,392,508 | B2 | 7/2016 | Senarath et al. |
| 9,445,335 | B2 | 9/2016 | Fu et al. |
| 9,451,517 | B2 | 9/2016 | Harrang |
| 9,491,679 | B2 | 11/2016 | Agardh et al. |
| 9,629,104 | B2 | 4/2017 | Gibbon et al. |
| 9,720,099 | B1 | 8/2017 | Ekambaram et al. |
| 2008/0016213 | A1 | 1/2008 | Akinaga et al. |
| 2016/0021508 | A1* | 1/2016 | Dunkin ............ H04L 67/2847 701/518 |
| 2016/0037379 | A1* | 2/2016 | Shafiee ............ H04W 28/0268 370/230.1 |
| 2016/0380820 | A1 | 12/2016 | Horvitz et al. |
| 2017/0303333 | A1 | 10/2017 | Zhao et al. |
| 2017/0357381 | A1 | 12/2017 | Dal Santo et al. |
| 2018/0049274 | A1* | 2/2018 | Kim .................. H04W 36/245 |
| 2018/0176325 | A1* | 6/2018 | Liang ................ H04L 65/4084 |
| 2019/0036630 | A1* | 1/2019 | Svennebring ......... H04W 40/12 |
| 2019/0147260 | A1* | 5/2019 | May .................... B60W 50/14 382/103 |
| 2019/0319686 | A1* | 10/2019 | Chen, IV ............ H04W 72/046 |
| 2019/0357301 | A1* | 11/2019 | Li ........................ H04W 80/12 |
| 2020/0162990 | A1* | 5/2020 | Reimann .............. H04W 36/32 |

OTHER PUBLICATIONS

Author Unknown, "Technical Specification Group Services and Systems Aspects; System Architecture for the 5G System; Stage 2 (Release 15)," 3GPP TS 23.501, Version 15.3.0, Sep. 2018, 3GPP Organizational Partners, 226 pages.

Author Unknown, "Technical Specification Group Services and Systems Aspects; Telecommunication management; Performance Management (PM); Performance measurements Evolved Packet Core (EPC) network (Release 15)," 3GPP TS 32.426, Version 15.1.0, Sep. 2018, 3GPP Organizational Partners, 103 pages.

Author Unknown, "Technical Specification Group Services and Systems Aspects; Service requirements for the 5G system; Stage 1 (Release 16)," 3GPP TS 22.261, Version 16.5.0, Sep. 2018, 3GPP Organizational Partners, 67 pages.

Evensen, K. et al., "Mobile Video Streaming Using Location-Based Network Prediction and Transparent Handover," Network and Operating System Support for Digital Audio and Video (NOSSDAV) Conference, Vancouver, British Columbia, Jun. 1-3, 2011, ACM, 6 pages.

Wang, H. et al., "A moving direction prediction-assisted handover scheme in LTE networks," EURASIP Journal on Wireless Communications and Networking, vol. 190, 2014, Springer, 10 pages.

Author Unknown, "Technical Specification Group Services and Systems Aspects; Study of Enablers for Network Automation for 5G (Release 16)," 3GPP TR 23.791, Version 16.0.0, Dec. 2018, 3GPP, 122 pages.

Author Unknown, "Technical Specification Group Services and Systems Aspects; Architecture enhancements for 5G System (5GS) to support network data analytics services; (Release 16)," 3GPP TS 23.288, Version 0.1.0, Feb. 2019, 3GPP, 20 pages.

International Search Report and Written Opinion mailed for International Patent Application No. PCT/IB2020/050931, dated Mar. 26, 2020, 13 pages.

* cited by examiner

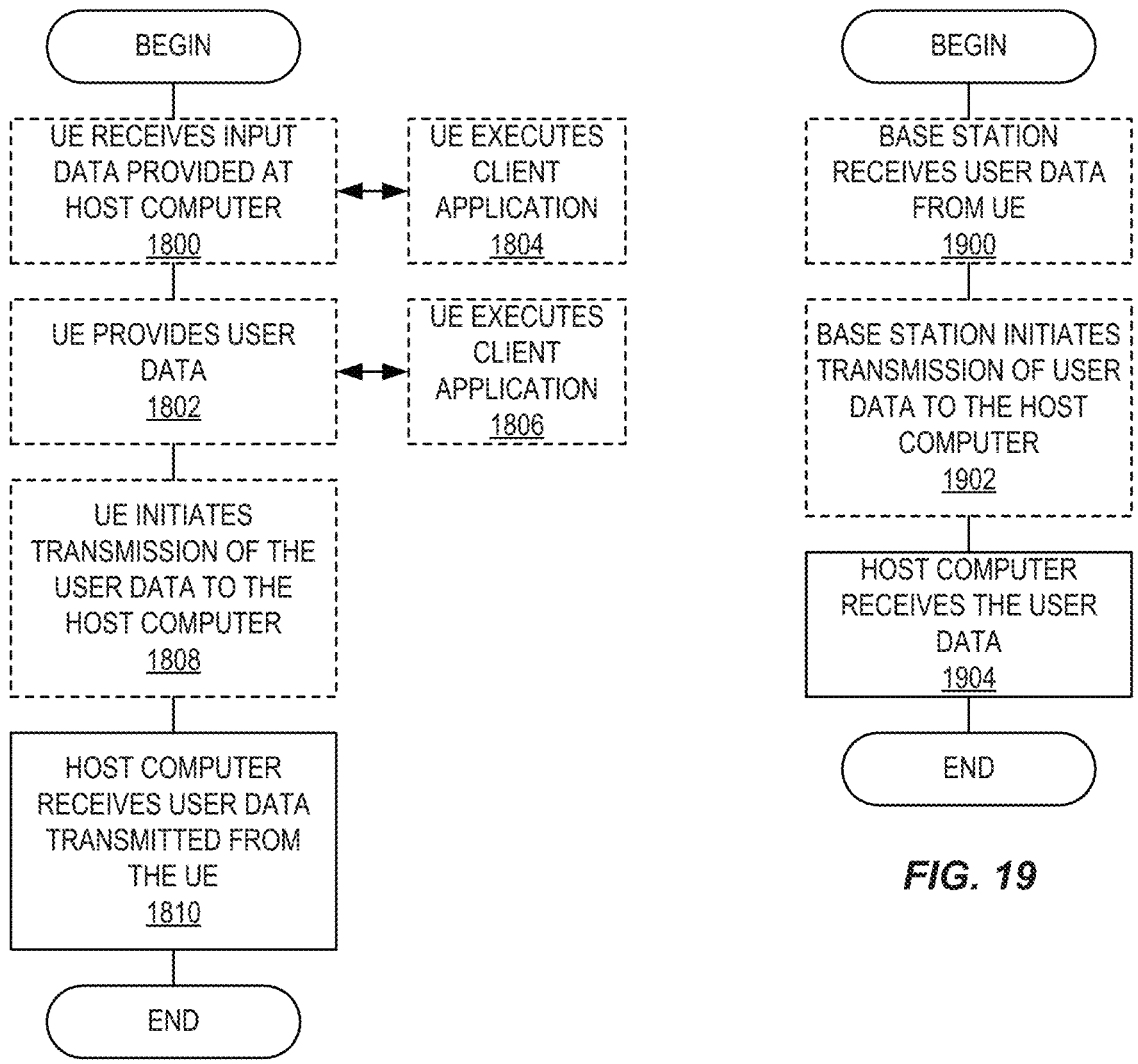

METHOD FOR END-TO-END (E2E) USER EQUIPMENT (UE) TRAJECTORY NETWORK AUTOMATION BASED ON FUTURE UE LOCATION

TECHNICAL FIELD

The present disclosure relates to network automation, and particularly to User Equipment (UE) trajectory network automation based on future UE location.

BACKGROUND

FIG. 1 illustrates a generic view of a conventional Fifth Generation (5G) data driven Network Data Analytics Function (NWDAF), showing a portion of a conventional telecommunications core network that contains a NWDAF. The NWDAF receives data from a variety of data providers, which may include NFs and/or Application Functions (AFs). The NWDAF stores the data, e.g., locally and/or on one or more data repositories, for later access as needed. The NWDAF receives requests for data from a variety of data consumers, and responds to those requests, e.g., by delivering analytics data. In the embodiment illustrated in FIG. 1, the NWDAF may also communicate with an Operations, Administration, and Maintenance (OAM) node, which may also be referred to as an Operation and Maintenance (O&M) node. It should be noted that a data provider may also be a data consumer, and that the NWDAF, data repositories, and OAM node may also be data providers, data consumers, or both. The NWDAF will be used as a reference example for a discussion about network automation, but it is noted that network automation is a generic term that could be applied in 5G networks, Fourth Generation (4G)/Long Term Evolution (LTE) networks, or in Software Defined Networks (SDNs) in a Wide-Area Network (WAN), called SD-WAN.

One of the functions of the NWDAF is to assist network automation, which is the process of automating the configuration, management, testing, deployment, and operations of physical and virtual devices within a network. One aspect of network automation is to determine where a User Equipment (UE) is and to predict where the UE will be at some point in the future. The NWDAF performs data collection and data analytics in a centralized manner.

Problems with Existing Solutions

The Third Generation Partnership Project (3GPP) Technical Specification (TS) 23.791 acknowledges a deficiency of conventional NWDAFs:

Begin Excerpt 1 from 3GPP TS 23.791

5.1.1 Use Case 1: <how to get information from AF>
5.1.1.1 Description
Operators have already been able to collect some network information, e.g. through OAM to obtain the network data. However, the operators lack information from the service applications, especially for the 3rd party service applications. As a result, it is difficult for the operators to measure the actual service experience for the users and also don't know how to optimize the service.

Different service applications usually have different service requirement and probably could change their service frequently since the OTT behavior may often change based on its own requirement. Thus it is needed to define a framework for data retrieval from AF(s).
define common data that could be retrieved across multiple applications.

NOTE: The Study cannot define all data that may be retrieved from an application as such data may be application dependent.

Also some parameters, e.g. communication pattern and background traffic policy have already been defined in TS 23.501 [2]/TS 23.502 [3], which could be useful for the NWDAF architecture.

The use case is required to study how and what information the NWDAF obtains from the service applications.

In case of an AF belonging to a 3rd party would provide data to support NWDAF analytics, the AF may provide data to the NWDAF via the NEF. This use case requires to study potential signalling load impacts on the NEF End Excerpt 1 from 3GPP TS 23.791

The first excerpt from 3GPP TS 23.791 acknowledges that conventional network operators do not have access to information possessed by 3PPs, that this information would come through the Network Exposure Function (NEF), and that further study is needed to determine how this might impact signaling load on the NEF.

Begin Excerpt 2 from 3GPP TS 23.791

1.1.1 5.1.4 Use Case 4: <Using NWDA output to customize mobility management>
1.1.1.1 5.1.4.1 Description
As investigated by SA WG1 and SA WG2, diverse service scenarios in 5G will introduce different requirements on mobility support, which requires on demand mobility management in 5G network, i.e. the 5G network should apply customized mobility management for UEs with different mobility and/or different usage patterns.

In 5G phase 1, SA WG2 has introduced mobility pattern to differentiate UE mobility behaviours, and discussed how to use the mobility pattern, but did not define the exact content of the UE mobility pattern and how to obtain the UE mobility pattern. This use case considers that the NWDAF can provide UE mobility related analytical report based on analysis on historical UE location, UE mobility behaviours and so on. Then, it will be feasible for the 5GC to use the NWDA analytical results on a UE to customize the mobility management applied to the UE.

With the help of analytical results from the NWDAF, the 5GC can customize or optimize mobility management for each UE, including:

Optimizing registration area allocation to reduce mobility registration update.
Paging handling optimization.
Adjusting mobility restriction area to accurately determine restriction area.
NAS signalling connection management optimization to improve system efficiency and promise user experience.

Adjusting periodic registration timer value to signalling saving.
Handover optimization.
Overload avoidance.
Therefore, within this use case, following issues are required to be investigated:
  What necessary information should be provided to the NWDAF to support the analysis related to the per UE mobility management?
  What analytical results can be provided by the NWDA for per UE mobility management optimization?
  Which network function(s) can directly interact with the NWDA to retrieve/receive the analytical results?
  Beside mobility pattern, what other information can be used by the 5GC to customize mobility management for related UEs?
  How to customize mobility management by using the UE mobility pattern and other information— Including:
    Whether and how registration area allocation will be optimized.
    Whether and how paging handling will be optimized.
    Whether and how mobility restriction area will be adjusted.
    Whether and how NAS signalling connection management will be optimized.
    Whether and how periodic registration timer value will be adjusted.
    Whether and how handover decision will be optimized.
    Whether and how overload avoidance will be performed.

End Excerpt 2 from 3GPP TS 23.791

The second excerpt from 3GPP TS 23.791 acknowledges that the 3GPP SA WG2 working group has introduced the concept of a mobility pattern, and concludes with a list of topics that require further study. It is noted, however, that mobility patterns are based on past ("historical") behaviors of the UE. There is no mention of receiving information about a future location of the UE, much less of using such information in mobility management operations.

Begin Excerpt 3 from 3GPP TS 23.791

5.1.10 Use Case 10: NWDA-assisted determination of areas with oscillation of network conditions
5.1.10.1 Description
Operators already use mechanisms for collection of information that enable CP and OAM to detect situations affecting the QoS of provided services. These current mechanisms are designed in a compartmentalized way i.e. focusing on per NF information data collection (e.g. TS 32.426 [7] defines measurements related to EPC entities—such as MME, etc. —which are aggregated values such as mean number of dedicated EPS bearers in active mode). In 5G, different services, such as URLLC (as defined in TS 22.261 [8]) and V2X (as recently defined in the SA WG1 FS_V2XIMP and SGAA NESQO), may require a network wide analysis to verify/improve NF deployment and configuration (e.g. wrt. the selection of the UPF). Operators will also be able to improve how to handle the effects of network slice dynamicity in E2E QoS assurance per slice and/or per type of service (i.e. performance requirements for groups of UEs associated with a type of service, e.g. V2X).
This use case investigates how NWDAF can be leveraged to collect information from the different sources NF(s), and Application Function, and provide analytics about segments/areas of the network where the provided QoS could be improved. By correlating and analyzing information coming from NF(s) with information coming from the AF (like MOS), NWDAF can provide statistical information that enables operators to change network deployment and configuration to improve E2E QoS.
Examples of potential improvements that could be triggered by analytics/prediction are:
  a) The Application function offline report the service data (like MoS) to NWDAF, allowing NWDAF to have a snapshot of service experience for specific UEs.
  b) The NWDAF correlates the service data with the information provided by the 5GS NF(s) to find out why the service experience is good or bad.
  c) With the data analytics provided by NWDAF, the 5GS NF is able to improve service experience (e.g. in areas with dense traffic, for instance, the best compromise (cost/service delay) for UPF location could be determined).
  d) In addition, the network could inform the application Function when UE is getting close to a potentially overloaded area, so that application Function can know that there is a higher chance of oscillation on network conditions.

End Excerpt 3 from 3GPP TS 23.791

The third excerpt from 3GPP TS 23.791 investigates how the NWDAF might use Quality of Service (QoS) information received from different network functions and application functions within the Public Land Mobile Network (PLMN) domain to identify segments or areas of the network where QoS could be improved.

Begin Excerpt 4 from 3GPP TS 23.791

5.1.12 Use Case 12: <NWDA-Assisted predictable network performance>
5.1.12.1 Description
During autonomous driving, it would be helpful for advancing vehicles case to get predictable network performance (e.g. latency, reliability) of upcoming NG-RAN, i.e. eV2X application server can decide whether keeping autonomous driving mode in the upcoming NG-RAN based on the predicted network performance. Network performance of upcoming NG-RAN analyzed/predicted by NWDAF may consider the factors, e.g. speed and direction or upcoming location of the vehicle, network performance related information (load information based on time and spatial information).
In order to assist the decision of eV2X application server bases on predictable network performance from NWDA output, this use case considers the following issues:
  What analytical result is required to be provided by the NWDA to V2X application server?

What input information is required for NWDAF to derive the analytical result and how to get this input information?

NOTE: Prediction period may be also studied, e.g. based on the requirement of service.

End Excerpt 4 from 3GPP TS 23.791

The fourth excerpt from 3GPP TS 23.791 identifies autonomous driving as something that would benefit from the kinds of analysis that could be performed by an NWDAF, and identifies some issues that should be considered by the working group.

In short, 3GPP TS 23.791 identifies a number of areas that are subjects for future study, but does not propose any solutions to those problems. Although the NWDAF can provide valuable information about, and insight into, a network's current condition, conventional NWDAFs have access only to data provided to it by other nodes within the core network, such as a 5G Core Network (5GC). While this allows the NWDAF to make predictions about a UE's trajectory, based on extrapolation of historical location information, for example, such predictions have limited confidence—past behavior is no guarantee of future behavior. Because a conventional NWDAF can make only rough and uncertain predictions about mobility trajectories, the ability of network automation to proactively address or even avoid problems such as network capacity overload due to mobile device trajectories, for example, is severely limited. This is in large part due to the fact the conventional core networks do not have advance information about where a mobile user is planning to go or when the mobile user is planning to go there. At best, network automation can only make predictions about where a next handover is likely to occur, e.g., it may be able to predict a next hop. In short, one weakness of conventional telecommunication network automation is that the network itself has no way to determine an "End-to-End" (E2E) trajectory of a mobile device.

SUMMARY

Methods and systems for End-to-End (E2E) User Equipment (UE) trajectory network automation based on future UE location are herein provided. As described herein, network automation functions will be capable of receiving in advance E2E UE mobility trajectory information. In some embodiments, a conventional Network Data Analytics Function (NWDAF) is enhanced to save not only past UE location information but also future UE location information, which may be provided to it by Third Party Providers (3PPs) outside of the Core Network (CN) and/or applications hosted by the UE. In some embodiments, the NWDAF can predict future UE location information using Machine Learning (ML) algorithms executing on the NWDAF or other CN node.

The ability to predict E2E mobility trajectories makes possible a number of additional advantages and optimizations. For example, in some embodiments, the NWDAF has access to E2E trajectory requests made by applications hosted by the UE. The NWDAF can predict the network performance on the requested mobility trajectory (or future stationary UE location) and take proactive steps to configure the network resources accordingly. Likewise, the NWDAF can propose alternative routes that represent a better E2E trajectory based on some metric or qualification, e.g., an alternative route may be cheaper, may have better Quality of Service (QoS), etc. In some embodiments, the user can then select the preferred mobility trajectory, e.g., via an application on the UE, and the network automation function will be able to adjust network to maintain the predicted/committed network performance (dynamically proposed Service Level Agreement (SLA)) during the mobility trajectory and in the future stationary location of the UE.

According to one aspect of the present disclosure, a method, performed in a network node within a telecommunications network, for E2E UE trajectory network automation comprises: receiving, from a requesting entity, information identifying a future E2E UE trajectory, the identified future E2E UE trajectory comprising a start location, an end location, and zero or more intermediate locations between the start location and the end location; calculating a E2E mobility trajectory prediction for the identified future E2E UE trajectory; and sending, to the requesting entity, the calculated E2E mobility trajectory prediction.

In some embodiments, the network node comprises at least one of: a NWDAF; and a Policy Control Function (PCF).

In some embodiments, the requesting entity comprises an untrusted application function.

In some embodiments, the request from the requesting entity is received from a Network Exposure Function (NEF) or a Service Capability Exposure Function (SCEF).

In some embodiments, the requesting entity comprises an application hosted by a UE.

In some embodiments, the request from the requesting entity is received from a User Plane Function (UPF).

In some embodiments, receiving the information identifying a future E2E UE trajectory comprises receiving information comprising network slice characteristics.

In some embodiments, the network slice characteristics comprise: an expected average downlink throughput per step or turn; an expected average downlink throughput during the stops; an expected average uplink throughput per step or turn; an expected average uplink throughput during the stops; an expected average latency per step or turn; an expected average latency during the stops; an expected average jitter per step or turn; an expected average jitter during the stops; an expected average reliability; an expected cost of tolls; and/or an expected cost per bit.

In some embodiments, receiving a start location comprises receiving: an estimated time to start; a latitude or equivalent; a longitude or equivalent; and/or an altitude or equivalent.

In some embodiments, receiving an end location comprises receiving: a latitude or equivalent; a longitude or equivalent; and/or an altitude or equivalent.

In some embodiments, receiving zero or more intermediate locations comprises receiving one or more stops or proposed turns.

In some embodiments, receiving a stop comprises receiving: an estimated stop time; a latitude or equivalent; a longitude or equivalent; and/or an altitude or equivalent.

In some embodiments, receiving a proposed turn comprises receiving: a new heading or change of direction; a latitude or equivalent; a longitude or equivalent; and/or an altitude or equivalent.

In some embodiments, a new heading or change of direction comprises an indication of right, left, up, down, or back.

In some embodiments, sending the calculated E2E mobility trajectory prediction comprises sending a predicted UE experience on the identified future E2E UE trajectory.

In some embodiments, sending the predicted UE experience on the identified future E2E UE trajectory comprises sending: an identifier of the proposed route; an estimated time of arrival of the proposed route; an expected average downlink throughput per step or turn; an expected average downlink throughput during the stops; an expected average uplink throughput per step or turn; an expected average uplink throughput during the stops; an expected average latency per step or turn; an expected average latency during the stops; an expected average jitter per step or turn; an expected average jitter during the stops; an expected average reliability; an expected cost of tolls; and/or an expected cost per bit.

In some embodiments, sending the calculated E2E mobility trajectory prediction comprises sending a predicted UE experience on at least one alternative E2E mobility trajectory.

In some embodiments, sending the predicted UE experience on an alternative E2E mobility trajectory comprises sending: an identifier of the proposed route; an estimated time of arrival of the proposed route; an expected average downlink throughput per step or turn; an expected average downlink throughput during the stops; an expected average uplink throughput per step or turn; an expected average uplink throughput during the stops; an expected average latency per step or turn; an expected average latency during the stops; an expected average jitter per step or turn; an expected average jitter during the stops; an expected average reliability; an expected cost of tolls; and/or an expected cost per bit.

In some embodiments, the method further comprises: receiving, from the requesting entity, information identifying a selected E2E mobility trajectory; and sending mobility management and optimization information to a Radio Access Network (RAN).

In some embodiments, receiving the information identifying a selected E2E mobility trajectory comprises receiving information identifying a selected route.

In some embodiments, sending the mobility management and optimization information to a RAN comprises sending the mobility management and optimization information to a Next Generation (NG) RAN.

In some embodiments, sending the mobility management and optimization information to a RAN comprises sending the mobility management and optimization information directly to the RAN.

In some embodiments, sending the mobility management and optimization information to a RAN comprises sending the mobility management and optimization information via one or more of: a Core Access and Mobility Management Function (AMF); an Operation and Maintenance (O&M), function; and a Network Slice Selection Function (NSSF).

According to another aspect of the present disclosure, a network node for E2E UE trajectory network automation comprises: one or more processors; and memory storing instructions executable by the one or more processors, whereby the network node is operable to: receive, from a requesting entity, information identifying a future E2E UE trajectory, the E2E UE trajectory comprising a start location, an end location, and zero or more intermediate locations between the start location and the end location; calculate a E2E mobility trajectory prediction for the identified future E2E UE trajectory; and send, to the requesting entity, the calculated E2E mobility trajectory prediction.

In some embodiments, the network node is further operable to: receive, from the requesting entity, information identifying a selected E2E mobility trajectory; and send mobility management and optimization information to RAN.

According to one aspect of the present disclosure, a non-transitory computer readable medium storing software instructions that when executed by one or more processors of a network node for E2E UE trajectory network automation cause the network node to: receive, from a requesting entity, information identifying a future E2E UE trajectory, the E2E UE trajectory comprising a start location, an end location, and zero or more intermediate locations between the start location and the end location; calculate a E2E mobility trajectory prediction for the identified future E2E UE trajectory; send, to the requesting entity, the calculated E2E mobility trajectory prediction; receive, from the requesting entity, information identifying a selected E2E mobility trajectory; and send mobility management and optimization information to RAN.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 18 is a flowchart illustrating a method implemented in a communication system in accordance with one embodiment on the present disclosure; and FIG. 19 is a flowchart illustrating a method implemented in a communication system in accordance with one embodiment of the present disclosure.

DETAILED DESCRIPTION

Figure 1:
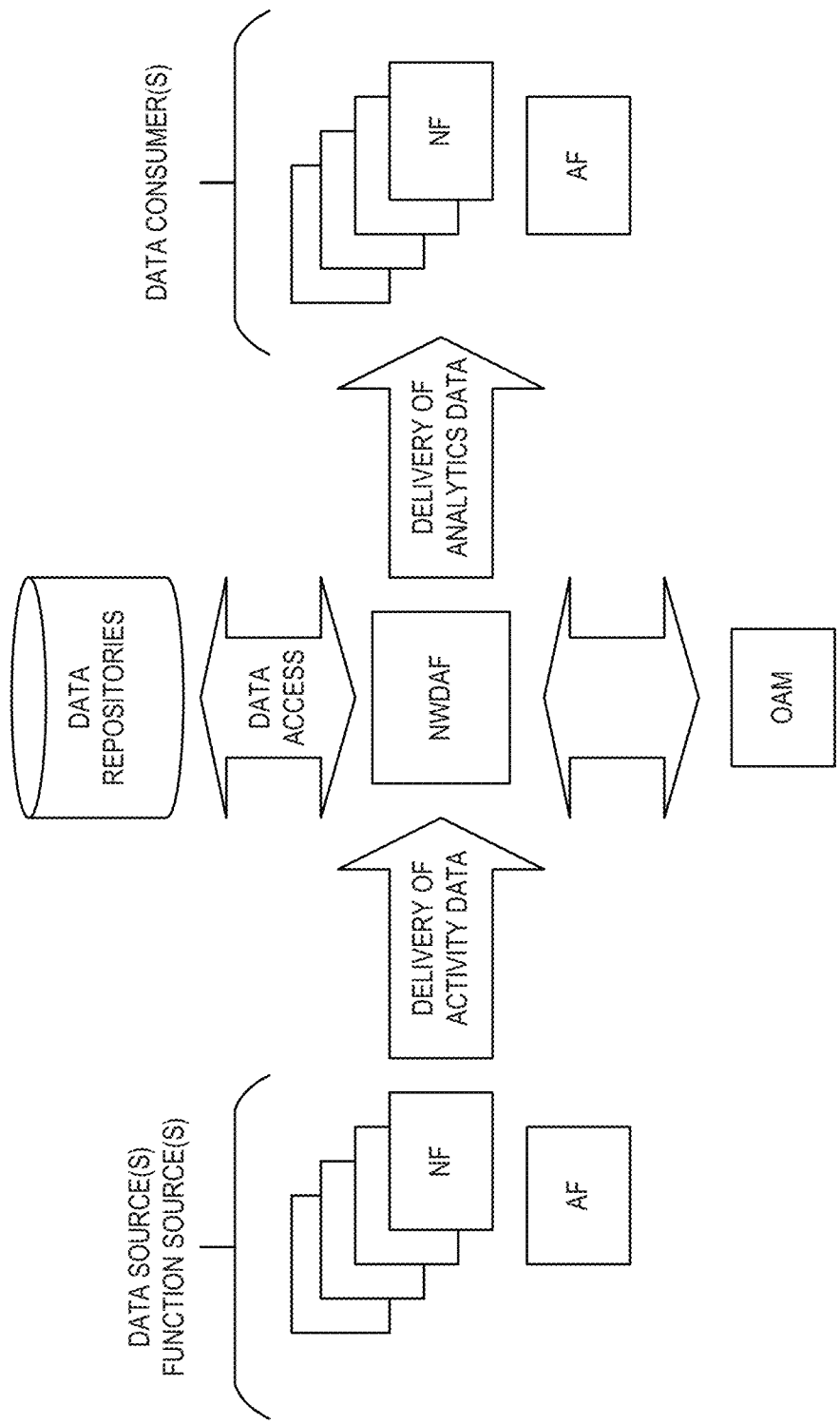
FIG. 1 illustrates a generic view of a conventional Fifth Generation (5G) data driven Network Data Analytics Function (NWDAF)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Inside a conventional Public Land Mobile Network (PLMN) domain there is no clear method for receiving, parsing, and processing future UE location and End-to-End (E2E) mobility trajectory information in relation to the past/historical measured and projected/predicted network performance/oscillations. For example, conventional Network Data Analytics Functions (NWDAFs) do not support any such mechanism to use information shared by a Third Party Provider (3PP). Furthermore, conventional networks have no method for suggesting re-routing of a UE trajectory based on network conditions, and have no method to allow network dynamic, on time, network adjustments based on the future location of the UEs.

Methods and systems for E2E UE trajectory network automation based on future UE location are herein provided. As described herein, network automation functions will be capable of receiving in advance E2E UE mobility trajectory information. In some embodiments, a conventional NWDAF is enhanced to save not only past UE location information but also future UE location information, which may be provided to it by 3PPs outside of the Core Network (CN) and/or applications hosted by the UE. In some embodiments, the NWDAF can predict future UE location information using Machine Learning (ML) algorithms executing on the NWDAF or other CN node.

In this manner, 3PPs that have knowledge of the potential future location of the UEs can send this information to the network automation functions, which can parse, process, and project the potential future UE location with reasonably good assurance. The network can also monitor the results of these projections vs the actual results measured later in other to propose adjustments on our predictive mechanisms. In addition, the predictive analysis of future UE locations enables the network to calculate future network capacity demands, including prediction of the types of UEs and/or applications that will be present in a future location. The combined information of future UE trajectories plus the projected network resources demands will allow network automation functions to adjust network in more advanced ways than current solutions.

According to one aspect, the present disclosure provides a set of APIs to be implemented by core network nodes, such as SCEF/Network Exposure Function (NEF), User Plane Function (UPF), etc., which will allow Geographic Information System (GIS) based applications to send tentative E2E trajectory information to the network analytics and automation functions, such as NWDAF, PCF, etc. In some embodiments, the network analytics and automation functions will parse the information, adding future UE location timestamps, and process it against the layered GIS information that supports different network perspectives such as performance, capacities, availability, etc. After the request is processed, the network analytics and automation will send back to the GIS based apps the expected network performance of the proposed mobility trajectory and alternative trajectories with better or similar network performance. GIS based apps will select the preferred mobility trajectory based on network performance and estimated time of arrival, and after the selection the network analytics and automation functions will adjust the network properly to deliver the predicted network performance.

The ability to predict E2E mobility trajectories makes possible a number of additional advantages and optimizations. For example, in some embodiments, the NWDAF has access to E2E trajectory requests made by applications hosted by the UE. The NWDAF can predict the network performance on the requested mobility trajectory (or future stationary UE location) and take proactive steps to configure the network resources accordingly. Likewise, the NWDAF can propose alternative routes that represent a better E2E trajectory based on some metric or qualification, e.g., an alternative route may be cheaper, may have better Quality of Service (QoS), etc. In some embodiments, the user can then select the preferred mobility trajectory, e.g., via an application on the UE, and the network automation function will be able to adjust network to maintain the predicted/committed network performance (dynamically proposed Service Level Agreement (SLA)) during the mobility trajectory and in the future stationary location of the UE.

One of the problems solved by the present disclosure is to provide a framework by which 3PPs that have knowledge of end to end mobility trajectory (e.g., Google) can easily share this information with the network automation entities such as NWDAF and take advantage of this business relationship. For example, in return for the 3PP providing the network with the future location of a UE, the network can make adjustments that will offer that UE a better network experience, which gives the 3PP consumer a better user experience. The network benefits because it receives valuable information about future UE locations, and the 3PP benefits because the user experience is improved.

Figure 2:
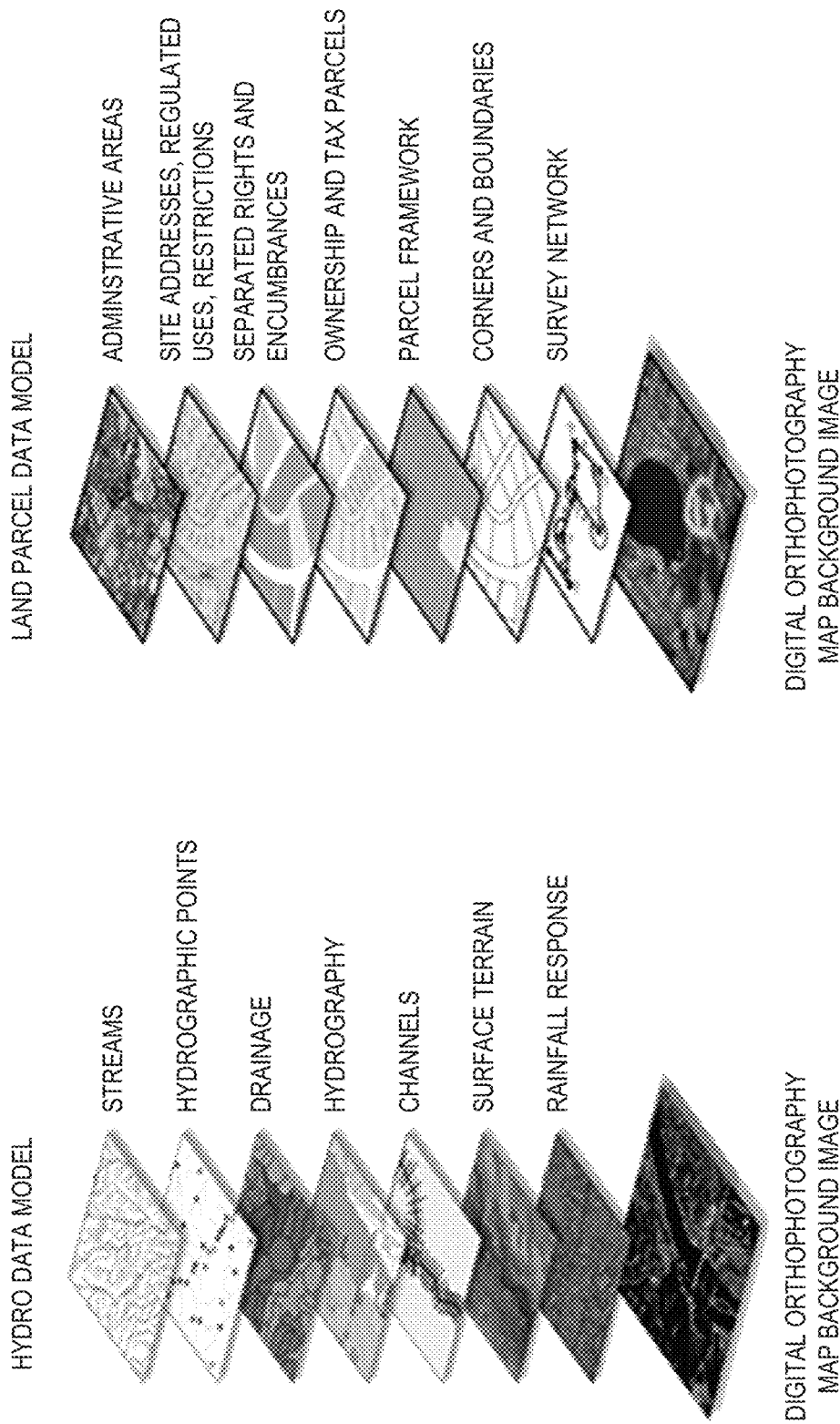
FIG. 2 illustrates an example of a generic layered Geographic Information System (GIS) platform.

FIG. 2 illustrates an example of a generic layered GIS platform. In the embodiment illustrated in FIG. 2, layers of information are logically grouped into two models, a hydraulic ("hydro") data model on the left, and a land parcel data model on the right. The hydro data model has layers to represent streams, hydrographic points, drainage, topography, channels, surface terrain, and rainfall response, overlaid on a digital orthophotography map background image. The land parcel data model has layers to represent administrative areas, site addresses, regulated uses, and restrictions, separate rights and encumbrances, ownership and tax parcels, parcel frameworks, corners and boundaries, and survey networks, overlaid on a digital orthophotography map background image. These are just examples of layers that may be includes in GIS systems, and just two examples of ways that such information can be logically grouped.

Conventional PLMN networks may possess similar kinds of GIS information, such as locations of cellphone towers, terrain, governmental boundaries such as county and city limits, but typically do not have information about roads, waterways, railways, air traffic lanes, and so on. GIS based online service providers, such as Google Maps, for example, typically do have such information.

Thus, in some embodiments, a GIS based online service provider can notify the PLMN in advance of the intended path of a UE. In some embodiments, this information may take the following form: a starting location; zero or more locations representing turns or stops en route; and an ending location. Each location may be defined in terms of a latitude and longitude, for example, and may also include altitude information or information identifying a range of possible altitudes (e.g., a floor and ceiling), or other information.

In some embodiments, this information is provided to or shared with a network automation data pool (which may also be referred to as a data lake), such as a NWDAF or other suitable network node. This information could be combined with other GIS information, such as the GIS information owned by the PLMN. Examples of PLMN GIS information include, but are not limited to: location of radio Access Points (APs) or Radio Access Networks (RANs); coverage maps from different Radio Access Technologies (RATs); coverage maps from different PLMNs or radio access providers, which may be 3GPP and/or non-3GPP; coverage maps from terrestrial, satellite, or any other type of aerial radio access providers; outdoor or in-building coverage maps; cost of data/service information; availability of mobile edge computing; and collected network performance/user experience indicators, such as throughput, latency, jitter, etc. Other GIS information provided by the PLMN or 3PP sources includes, but is not limited to: terrestrial paths, roads, streets, tolls, rights of way, etc.; and aerial paths, non-flying zones, and flying routes.

In some embodiments, based on this layered approach the PLMN network automation tools, such as a network automation function, could apply artificial intelligence/machine learning to predict the estimated network performance/oscillations during the requested mobility trajectory (UE mobility path) and in the planned stationary future location of the end user (e.g., events).

In some embodiments, the PLMN network uses the 3PP-supplied information to analyze alternative routes, provide estimated times of arrival, and calculate the associated network performance/network oscillations of these alternative paths. Based on that information the 3PP can maintain the UE mobility trajectory or re-route the UE because it could deliver better network performance during the UE trajectory.

Moreover, as the main function of NWDAF or Software Defined Network in a Wide-Area Network (SD-WAN) orchestration, these network automation functions can make the proper network adjustments to accommodate the estimated network performance in the selected mobility trajectory and in the stationary location of the UEs.

Thus, the rich set of information can be used to adjust the route based on the network performance, adjust the network configuration based on the selected route, or some combination of both.

Furthermore, the availability of data shared between the PLMN and 3PP allows the division of labor to be fluid. For example, in some embodiments, the NWDAF may implement an Intelligent Traffic System (ITS) layer which can make future predictions about Estimated Time of Arrival (ETA) of a device based on its current location and speed, which the 3PP can use to predict mobility trajectory based on specific routes. In some embodiments, the 3PP can use its detailed knowledge of roads, railways, and air traffic patterns to provide predictions about ETA of a device to the PLMN. In some embodiments, detailed knowledge of mobility trajectories allows a network to take proactive steps to improve network coverage and performance by placing nomadic nodes, such as flying nodes and balloons, into position as needed, or by using beam forming techniques from Multiple Input Multiple Output (MIMO) antennas and satellites, etc.

Figure 3:
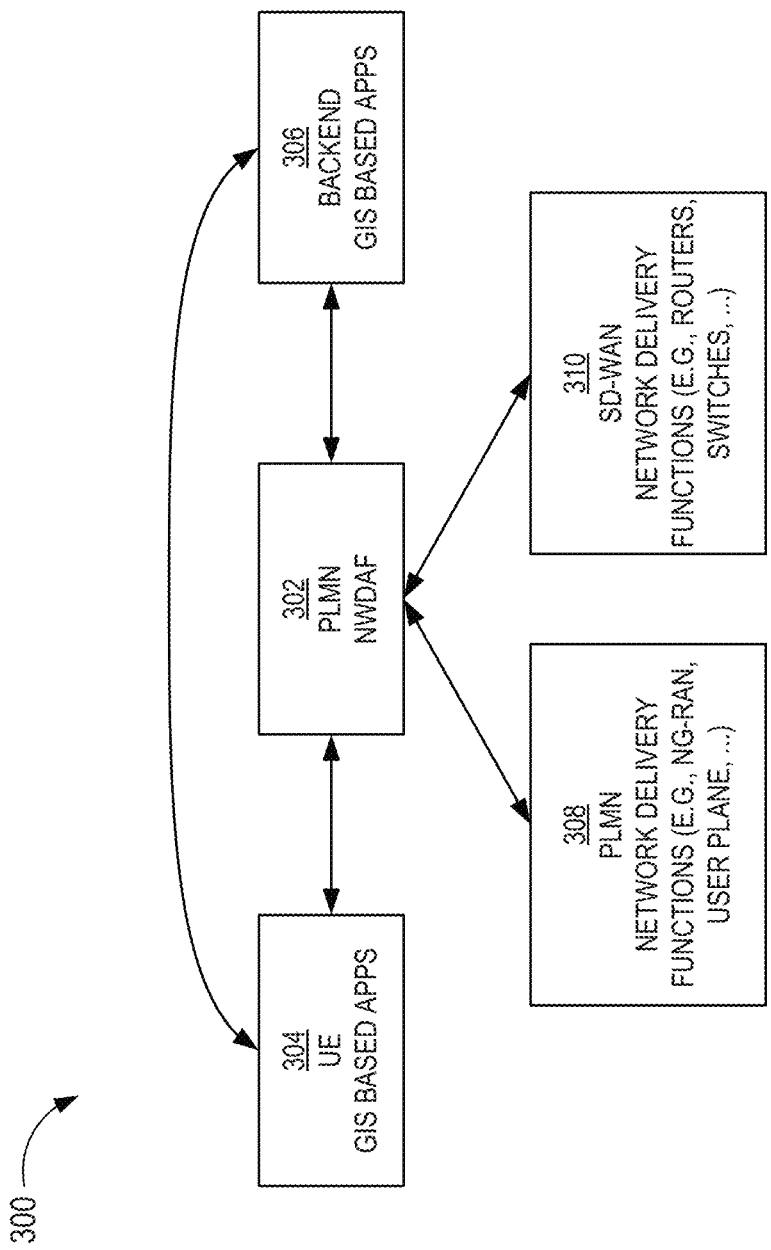
FIG. 3 illustrates an exemplary system for End-to-End (E2E) User Equipment (UE) trajectory network automation according to some embodiments of the present disclosure.

FIG. 3 illustrates an exemplary system for E2E UE trajectory network automation according to some embodiments of the present disclosure. In the embodiment illustrated in FIG. 3, a system 300 includes a PLMN node, such as a NWDAF, that can accept GIS or other information from applications hosted by a UE 304 within the PLMN domain and from backend functions 306 that are outside of the PLMN domain, including backend functions 306 associated with, and which communicate with, the UE applications 304. The PLMN node 302 communicates with PLMN network delivery functions 308 and SD-WAN network delivery functions 310.

Application Programming Interface (API)

The following are various embodiments illustrating exemplary implementations of an API on a NWDAF. In some embodiments, a Representational State Transfer (REST)-ful API is used, but other types of APIs are also contemplated in the present disclosure. In some embodiments, the following API requests and responses are defined, each having one or more fields and/or subfields.

SendE2EMobilityTrajectoryRequest—a request for information about an E2E mobility trajectory. As part of the end to end mobility trajectory end user experience request the Application Function (e.g., GoogleMaps) can send together with the mobility information, what they would expect from the network slices capabilities as end user experience, the network will then try to match as much as possible the request, or propose alternatives

| Field Name |
| --- |
| Subfield(s) |

1. Network Slice Characteristics

Expected average DL throughput per step/turn
Expected average DL throughput during the stops
Expected average UL throughput per step/turn
Expected average UL throughput during the stops
Expected average latency per step/turn
Expected average latency during the stops
Expected average jitter per step/turn
Expected average jitter during the stops
Expected average reliability
Expected cost of tolls
Expected cost per bit
Other. . . based on the availability of new network slice capabilities
2. Starting Point Estimated time to start
Latitude or equivalent
Longitude or equivalent
Altitude or equivalent
3. Stops Estimated stop time
Latitude or equivalent
Longitude or equivalent
Altitude or equivalent
4. Proposed Turns Right/Left
Latitude or equivalent
Longitude or equivalent
Up/Down
Altitude or equivalent
5. Ending Point Latitude or equivalent
Longitude or equivalent
Altitude or equivalent SendE2EMobilityTrajectoryUEPerformance—a response to a request for information about an E2E mobility trajectory.

| Field Name |
| --- |
| Subfield(s) |

1. Predicted UE experience on the requested E2E mobility trajectory

ID of the proposed route
ETA of the proposed route
Expected average DL throughput per step/turn
Expected average DL throughput during the stops
Expected average UL throughput per step/turn
Expected average UL throughput during the stops
Expected average latency per step/turn
Expected average latency during the stops
Expected average jitter per step/turn

| Field Name |
| --- |
| Subfield(s) |

Expected average jitter during the stops
Expected average reliability
Expected cost of tolls
Expected cost per bit
Other. . . based on the availability of new network slice capabilities
2. Predicted UE experience on alternate E2E mobility trajectories ID of the proposed route
ETA of the proposed route
Expected average DL throughput per step/turn
Expected average DL throughput during the stops
Expected average UL throughput per step/turn
Expected average UL throughput during the stops
Expected average latency per step/turn
Expected average latency during the stops
Expected average jitter per step/turn
Expected average jitter during the stops
Expected average reliability
Expected cost of tolls
Expected cost per bit
Other. . . based on the availability of new network slice capabilities
. . . repeat item 2 for each alternative route.

SendE2EMobilityTrajectorySelection—used to indicate a selected E2E mobility trajectory.

| Field Name |
| --- |
| Subfield(s) |

1. ID of the selected route

The foregoing API request/response definitions may be modified in various ways. For example, one or more subfields may be omitted from any of the aforementioned API requests/responses. In addition or alternatively, one or more subfields may be added. According to one example embodiment, the SendE2EMobilityTrajectoryRequest API may exclude the Network Slice Characteristics field and the SendE2EMobilityTrajectoryUEPerformance may exclude the Predicted UE experience on alternate E2E mobility trajectories field. This embodiment allows for receiving and sending predictions of the UE experience on one requested trajectory without proposing or receiving selection of any alternate trajectories.

In the examples disclosed herein, the Mobility Management and Optimization (MMO) messages are as defined by 3GPP specifications, but other types of MMO messages are also contemplated by the present disclosure.

In some embodiments, the ability to use E2E trajectories to predict network demand minutes, hours, or even days in advance complements or facilitates the use of MMO messages to adjust the network, such as adding capacity from 3PP via additional network slices/end to end SD-WAN capacity, adding new nodes by moving those into the area where there is additional demand or just adjusting the beam forming of nomadic nodes, cellular in wheels, flying nodes (e.g., Unmanned Aerial Vehicles (UAVs)), satellite/balloon nodes capacity, and adding capacity by changing network off load strategy into shared/unlicensed spectrum using 3GPP or Non-3GPP RATs.

Example Call Flows

FIGS. 4A through 4D and 5A and 5B illustrate exemplary call flows implementing methods for E2E UE trajectory network automation based on future UE location according to some embodiments of the present disclosure.

Mobility Trajectory Request from an Application Function

FIGS. 4A through 4D illustrate embodiments in which E2E mobility trajectory information is provided to the NWDAF from an untrusted source, i.e., from a 3PP AF, such as an online service provider, that is outside the PLMN domain.

Figure 4A:
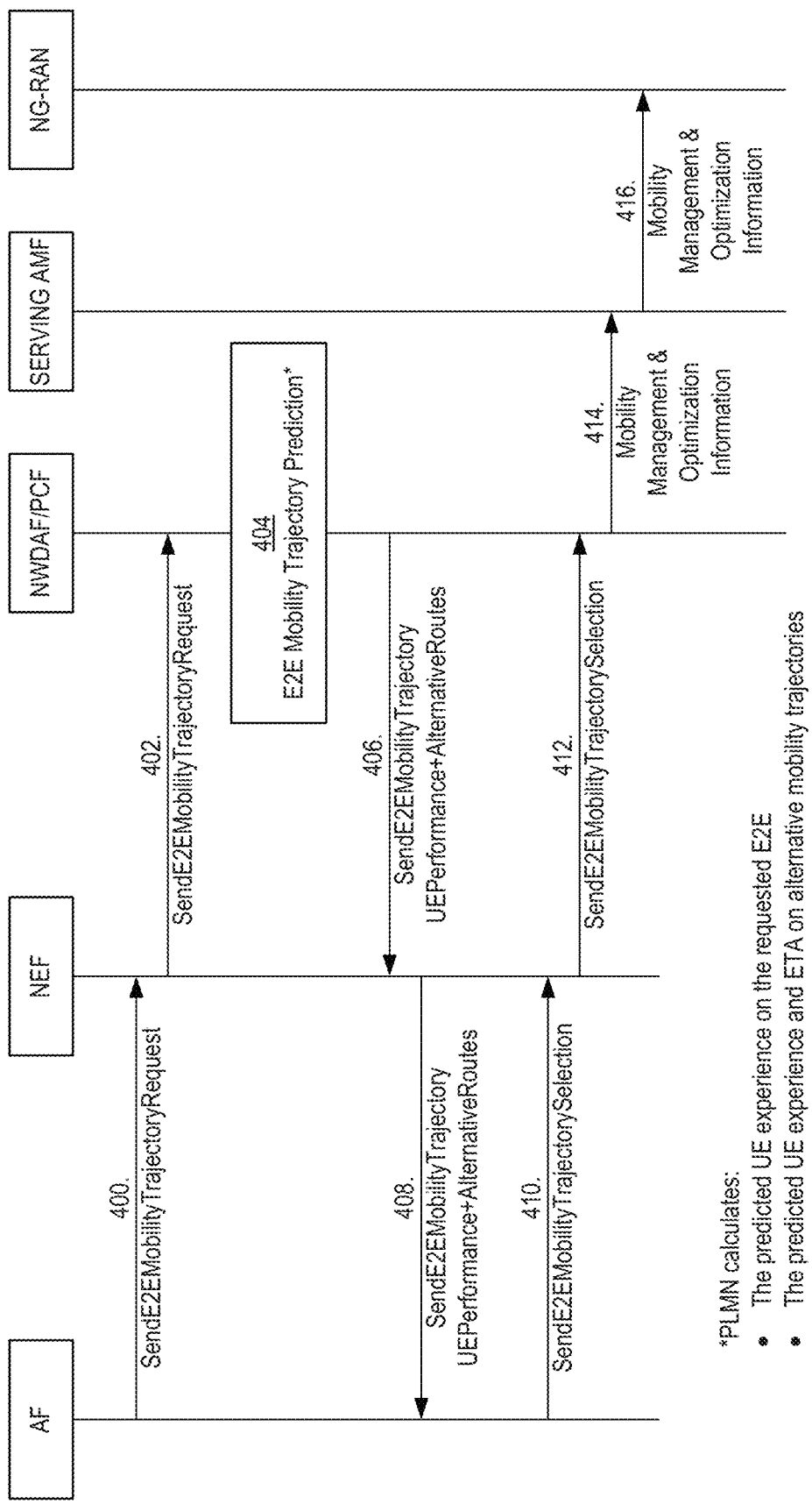
FIGS. 4A through 4D illustrate signals exchanged during an exemplary process for E2E UE trajectory network automation according to various embodiments of the present disclosure.

FIG. 4A illustrates signals exchanged during an exemplary process for E2E UE trajectory network automation according to some embodiments of the present disclosure. In the embodiment illustrated in FIG. 4A, the process includes the following steps:

At step 400, an application function sends a request, such as a SendE2EMobilityTrajectoryRequest message, to a node that provides an interface into the core network, such as an NEF. At step 402, the NEF forwards that message to a PLMN node that performs analysis, such as a NWDAF or PCF. At step 404, the PLMN node performs an E2E mobility trajectory prediction. In some embodiments, the PLMN calculates the predicted UE experience on the requested E2E path or route. In some embodiments, the PLMN calculates the predicted UE experience and ETA on alternative mobility trajectories.

At step 406, the PLMN node sends a response, such as a SendE2EMobilityTrajectoryUEPerformance message, to the NEF. At step 408, the NEF forwards this message to the AF. A trajectory is selected, and at step 410 the AF sends to the NEF a message, such as a SendE2EMobilityTrajectorySelection message, that indicates the selected trajectory. At step 412, the NEF forwards this message to the PLMN node. The trajectory selection may be performed by the AF with or without interaction with a corresponding application on the user's UE and with or without specific input from the user.

At step 414, the PLMN node provides mobility management and optimization information, which may be contained in MMO messages, to the serving Core Access and Mobility Management Function (AMF). At step 416, the AMF forwards this information to one or more nodes of the Next Generation RAN (NG-RAN).

Thus, in the call flow just described, after the request is parsed inside the data lake and processed by the network automation functions, the UE App, directly or via AF Backend, will receive the predicted network performance/ user experience in the requested mobility trajectory, and ETA, plus predicted network performance and/or user experience in the alternative mobility trajectories. In some embodiments, the ETA could be calculated inside NWDAF via an ITS layer, or by querying external Web Services APIs, like Google/Waze, etc. The user/machine/vehicle can select the preferred mobility trajectory and respond to the PLMN node (via the NEF) with the selected route. Based on that selection, the PLMN node may adjust (or initiate adjustment of) the network parameters, instantiate virtual network functions, move nomadic nodes, and/or adjust beams, etc., so that the network will be able to comply with the predicted network performance.

The ability to get information about future UE locations provides big benefits to a number of use cases. One such use case involves "connected cars", a use case in which multiple network slices are used for multiple purposes during the whole trajectory of the vehicle. It is important to properly manage the different demands of these different slices. Currently, connected cars primarily connect for entertainment, data collection, and basic driving instructions. In the future, however, there will be Vehicle-to-Everything (V2X) demands over Ultra-Reliable Low-Latency Communication (URLLC), so it will be necessary to maintain the UE within reliable coverage as much as possible, e.g., within the Low Band. On the other hand, for entertainment network slices, the goal may be to keep the UE on cheaper cost per bandwidth slices (e.g., Millimeter Wave (mmWave)/High Band or Mid-Band) or even to off-load onto an unlicensed spectrum as much as possible. This task will be made significantly easier with the knowledge of future UE locations now made available by the systems and methods provided herein.

The concepts present herein are not limited to cars and trucks, however. The same concepts could be applied to aerial vehicles, such as UAVs, drones, or even airplanes, all of which also can have a Three-Dimensional (3D) UE mobility trajectory, e.g., one that also includes altitude. Having advance knowledge of the UE trajectory in a three dimensional geographic space allows an operator to adjust terrestrial and aerial (A2G) networks, which may involve the use of satellites, balloons, and beamforming of signals along the paths of these flying UEs.

Yet another application of knowledge of future UE locations is to provide sufficient network resources to crowded hot spots, such as airports, malls, sports arenas, and so on, to manage the high network demands.

Figure 4B:
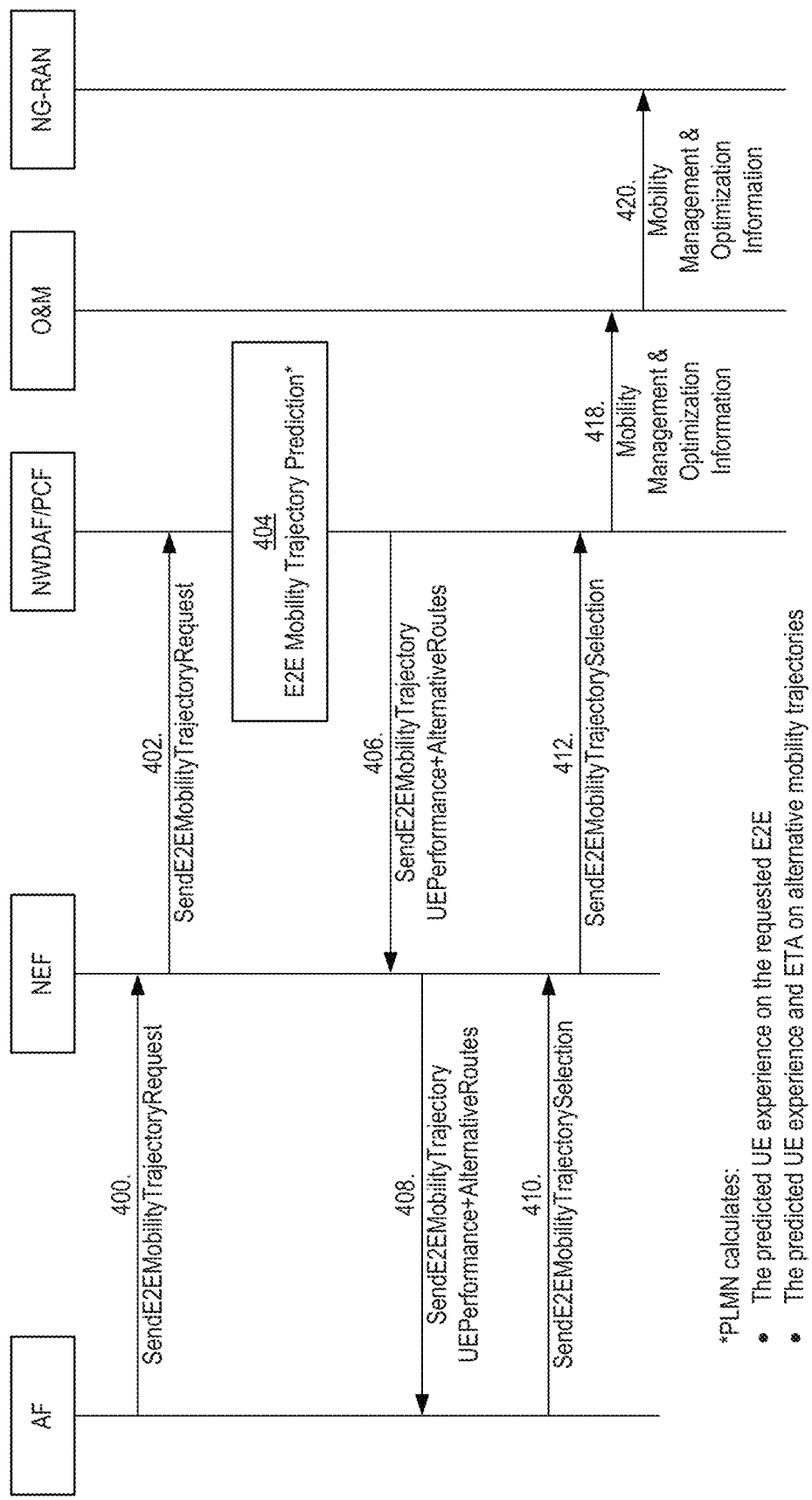

FIG. 4B illustrates signals exchanged during an exemplary process for E2E UE trajectory network automation according to some other embodiments of the present disclosure. Steps 400, 402, 404, 406, 408, 410, and 412 in FIG. 4B are the same as the like-numbered elements in FIG. 4A, so their descriptions will not be repeated here. In the embodiment illustrated in FIG. 4B, the mobility management and optimization information is sent to the NG-RAN via an Operation and Maintenance (O&M) node (steps 418 and 420) rather than via an AMF.

Figure 4C:
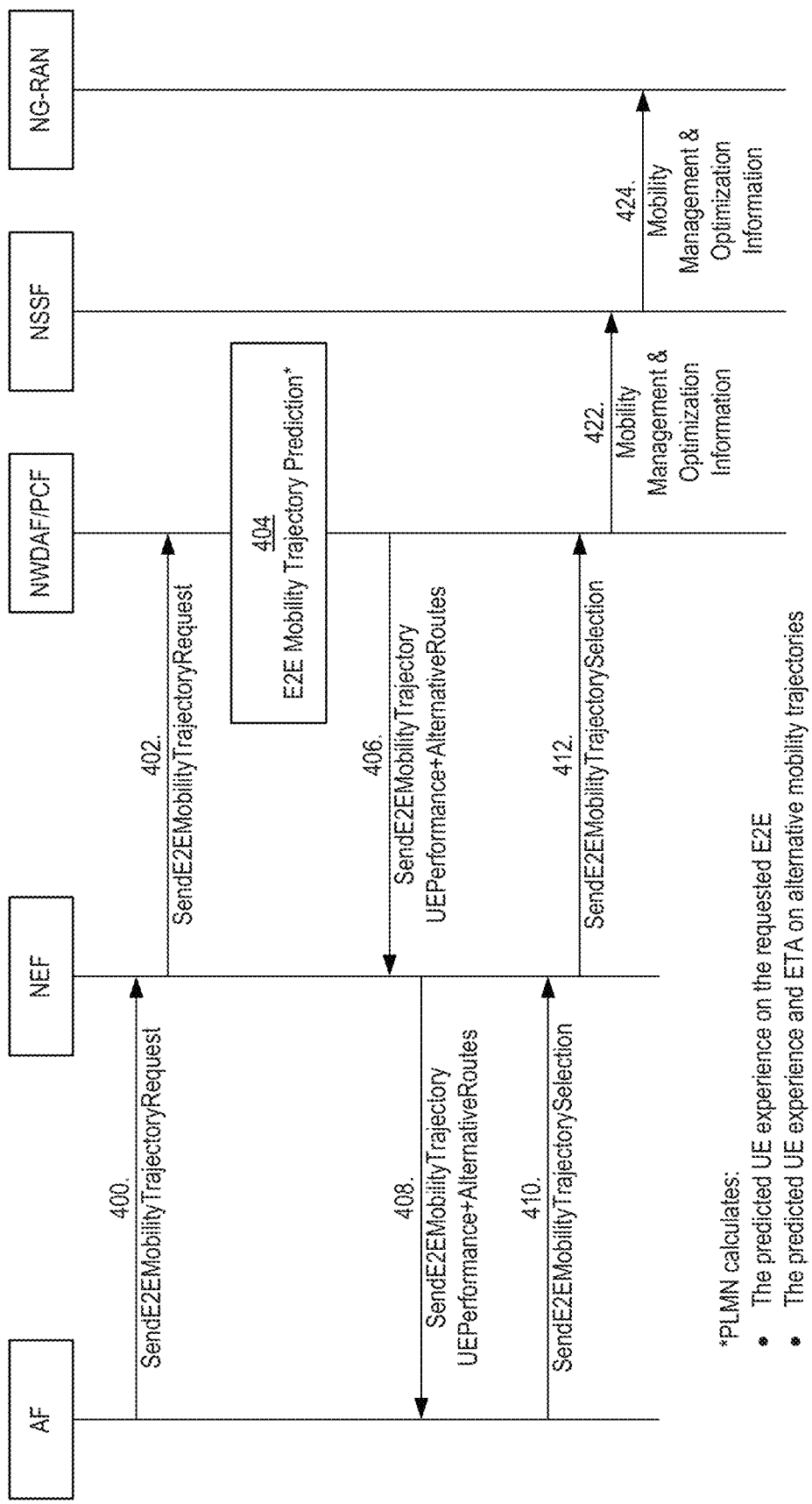

FIG. 4C illustrates signals exchanged during an exemplary process for E2E UE trajectory network automation according to some other embodiments of the present disclosure. Steps 400, 402, 404, 406, 408, 410, and 412 in FIG. 4C are the same as the like-numbered elements in FIG. 4A, so their descriptions will not be repeated here. In the embodiment illustrated in FIG. 4C, the mobility management and optimization information is sent to the NG-RAN via an Network Slice Selection Function (NSSF) (steps 422 and 424).

Figure 4D:
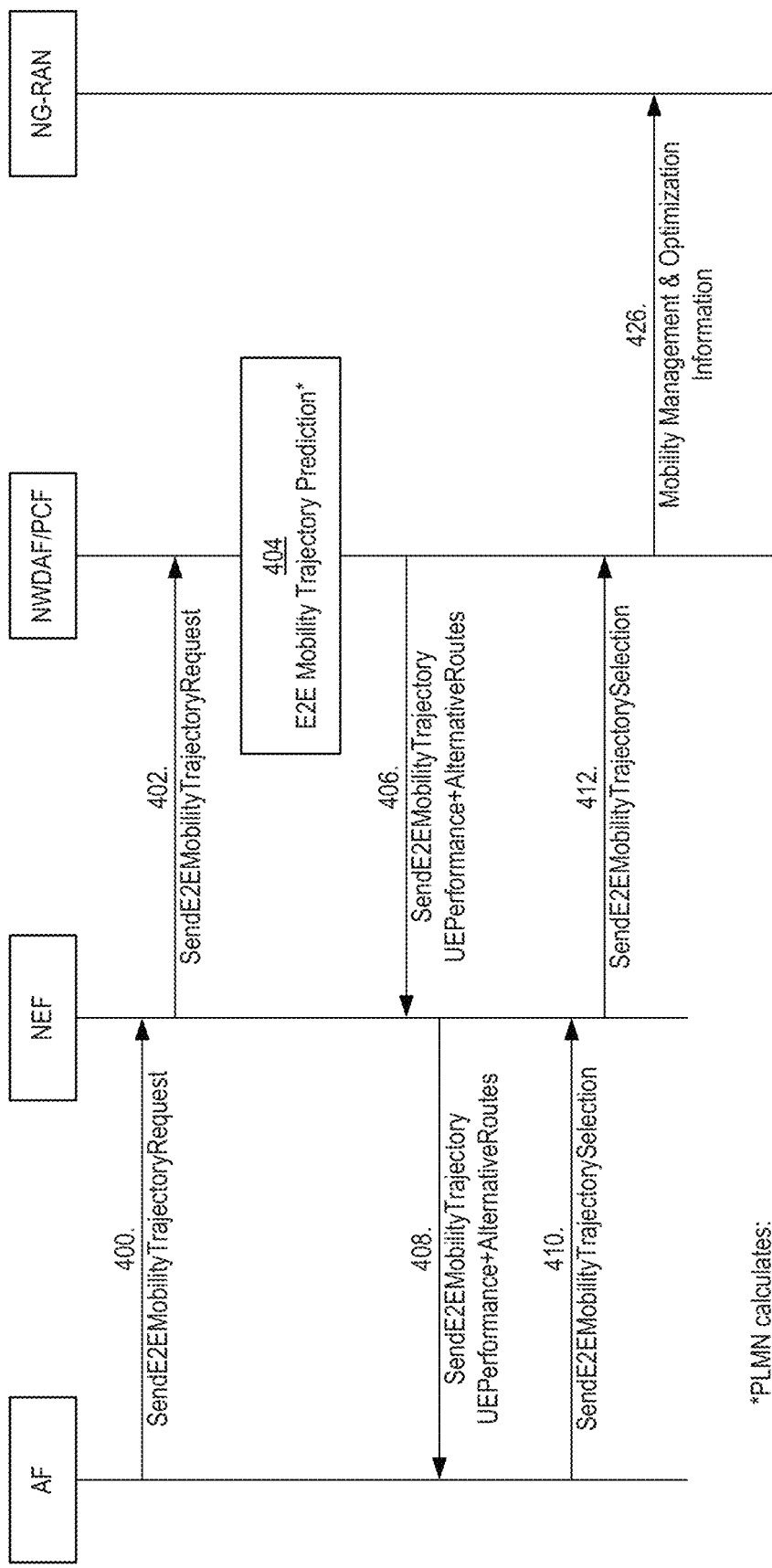

FIG. 4D illustrates signals exchanged during an exemplary process for E2E UE trajectory network automation according to some other embodiments of the present disclosure. Steps 400, 402, 404, 406, 408, 410, and 412 in FIG. 4D are the same as the like-numbered elements in FIG. 4A, so their descriptions will not be repeated here. In the embodiment illustrated in FIG. 4D, the mobility management and optimization information is sent directly to the NG-RAN (step 426).

Mobility Trajectory Request from a UE

Figure 5A:
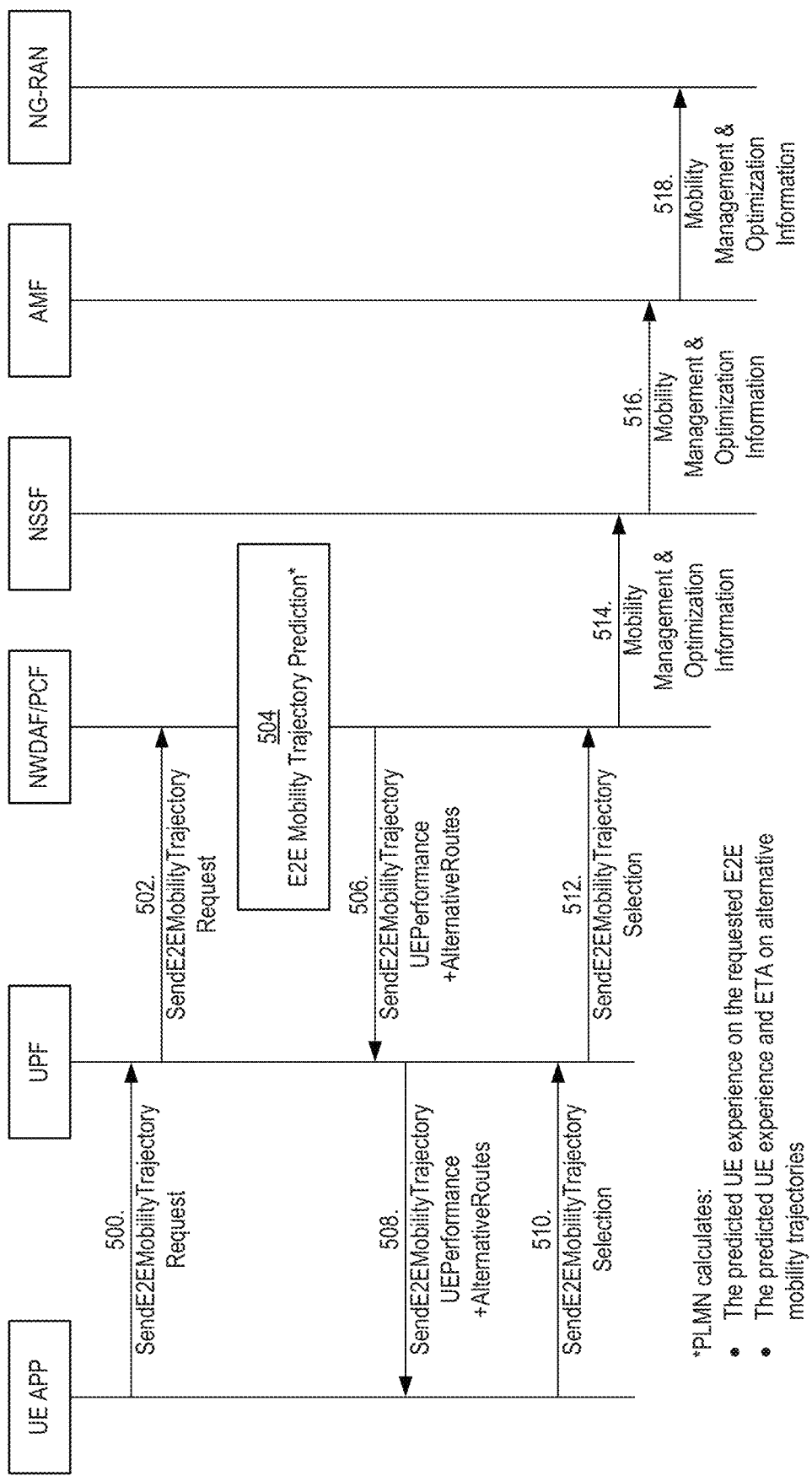
FIGS. 5A and 5B illustrate signals exchanged during an exemplary process for E2E UE trajectory network automation according to other various embodiments of the present disclosure.
Figure 5B:
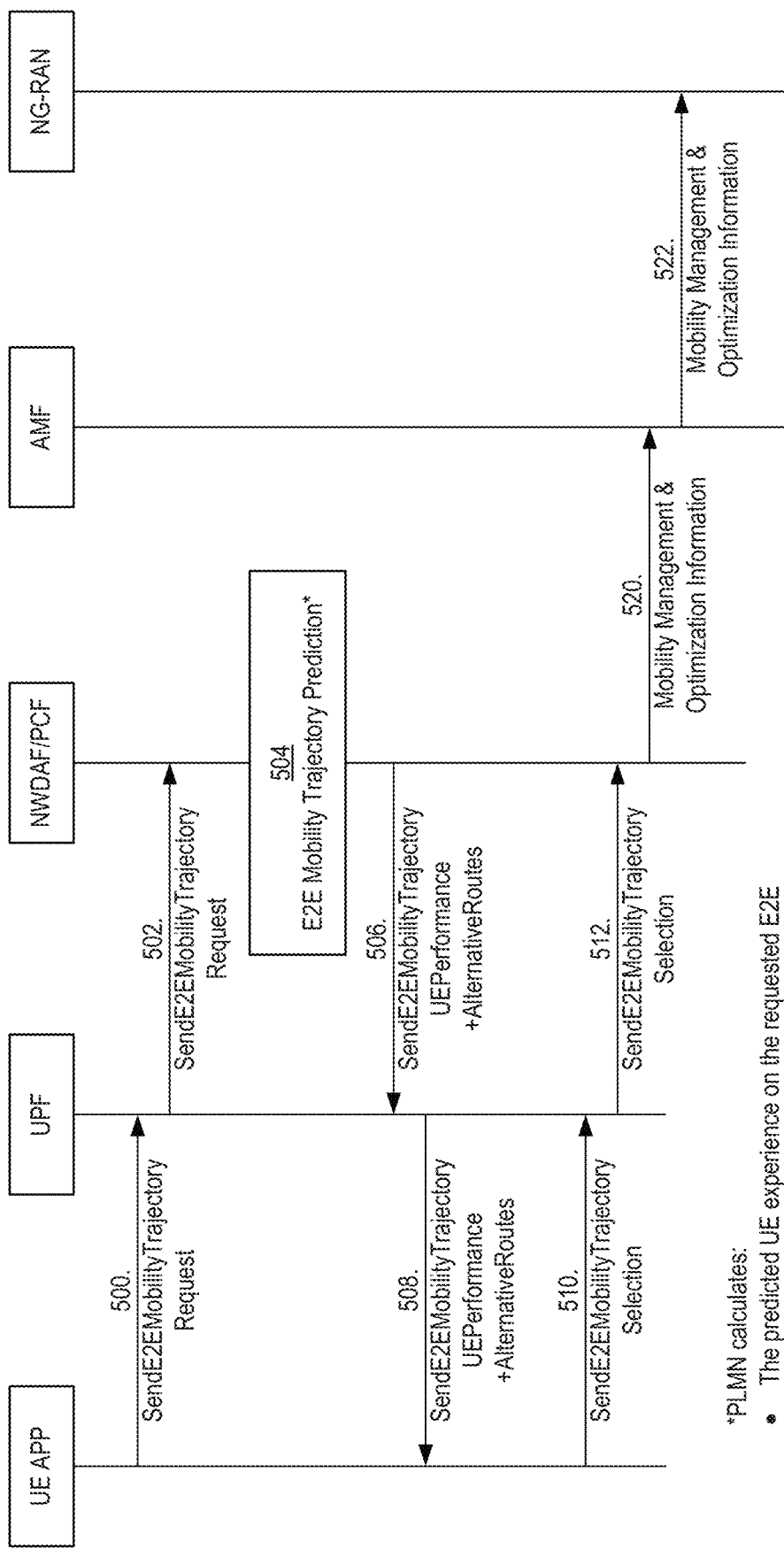

FIGS. 5A-B illustrate embodiments in which E2E mobility trajectory information is provided to the NWDAF from a trusted source, i.e., from an application hosted by a UE that is operating within the PLMN domain. In these embodiments, the UE application is treated as a type of AF and communication is delivered in the Data Network (DN) interface between a UPF and the Service Based Architecture (SBA) bus, which allows the information to be sent directly from the UE application to the network data lake, such as to the NWDAF.

FIG. 5A illustrates signals exchanged during an exemplary process for E2E UE trajectory network automation according to some embodiments of the present disclosure. In the embodiment illustrated in FIG. 5A, the process includes the following steps:

At step 500, an application hosted by a UE sends a request, such as a SendE2EMobilityTrajectoryRequest message, to a UPF. At step 502, the UPF forwards that message to a PLMN node that performs analysis, such as a NWDAF or PCF. At step 504, the PLMN node performs an E2E mobility trajectory prediction. In some embodiments, the PLMN calculates the predicted UE experience on the requested E2E path or route. In some embodiments, the PLMN calculates the predicted UE experience and ETA on alternative mobility trajectories.

At step 506, the PLMN node sends a response, such as a SendE2EMobilityTrajectoryUEPerformance message, to the UPF. At step 508, the UPF forwards this message to the UE application. A trajectory is selected, and at step 510 the UE application sends to the UPF a message, such as a SendE2EMobilityTrajectorySelection message, that indicates the selected trajectory. At step 512, the UPF forwards this message to the PLMN node. The trajectory selection may be performed by the UE application with or without interaction with a corresponding application function and with or without specific input from the user.

At step 514, the PLMN node provides mobility management and optimization information to an NSSF. At step 516, the NSSF forwards this information to the serving AMF. At step 518, the AMF forwards this information to the NG-RAN.

FIG. 5B illustrates signals exchanged during an exemplary process for E2E UE trajectory network automation according to some other embodiments of the present disclosure. Steps 500, 502, 504, 506, 508, 510, and 512 in FIG. 5B are the same as the like-numbered elements in FIG. 5A, so their descriptions will not be repeated here. In the embodiment illustrated in FIG. 5B, the mobility management and optimization information is sent directly to the AMF (step 520), which forwards this information to the NG-RAN (step 522).

Advantages of the Solutions Provided

The methods and systems provided herein can improve existing business models and drive new business models, such as technical solutions within the scope of Online Service providers focused on GIS, Mobility, Logistic or Fleet management. Examples of existing companies/online service providers that may benefit from some of the solutions provided herein include, but are not limited to, Uber, Didi, Lyft, GoogleMaps, Waze, Apple Maps, OpenTable, Foursquare, Glympse, UPS, DHL, Fedex, Amazon, etc. These companies, and others like them, as well as the services that they provide, are herein referred to generically as GIS-based applications.

Some of the solutions presented herein can also greatly benefit new disruptive RAN companies and solutions including, but not limited to, Nomadic Radio Access Point (NRAP) providers, connected cars, cellular on wheels, Flying Radio Access Points (FRAPs), UAVs, non-3GPP access point providers, and others.

Some of the advantages of the solutions herein presented may include one or more of the following:

Networks will be able to predict network performance, with the same time resolution as today traffic Online Service providers can predict estimated time of arrival;

Networks will be capable of auto-adjustments to deliver the committed/predicted network performance;

Networks will be capable of self-order, lease, new static and nomadic nodes, new capacity; and/or Networks will be capable of executing simulations and predictions of network performance in the future giving extimulated inputs, for example, we will be able to tell users their estimated network performance with days in advance for a given mobile trajectory.

Although the concepts presented herein are described in the context of the 5G core network, they also may be applied to LTE/4G/3G/2G and SD-WAN analytics, which can also benefit from the ability to anticipate end to end trajectory of UEs. For example, if the location of UEs can be predicted minutes, hours, or even days in advance, a network could adjust network capacity, adjust UE mobility trajectory and/or handovers, and propose UE trajectory rerouting. Additionally, there exists the possibility that while a user is within the expected path, dynamic traffic changes may prompt the 3PP to propose or announce an expected UE trajectory change, which may be first confirmed with the network operator's GIS data for better network performance alternative route suggestion.

Example Embodiments

Figure 6:
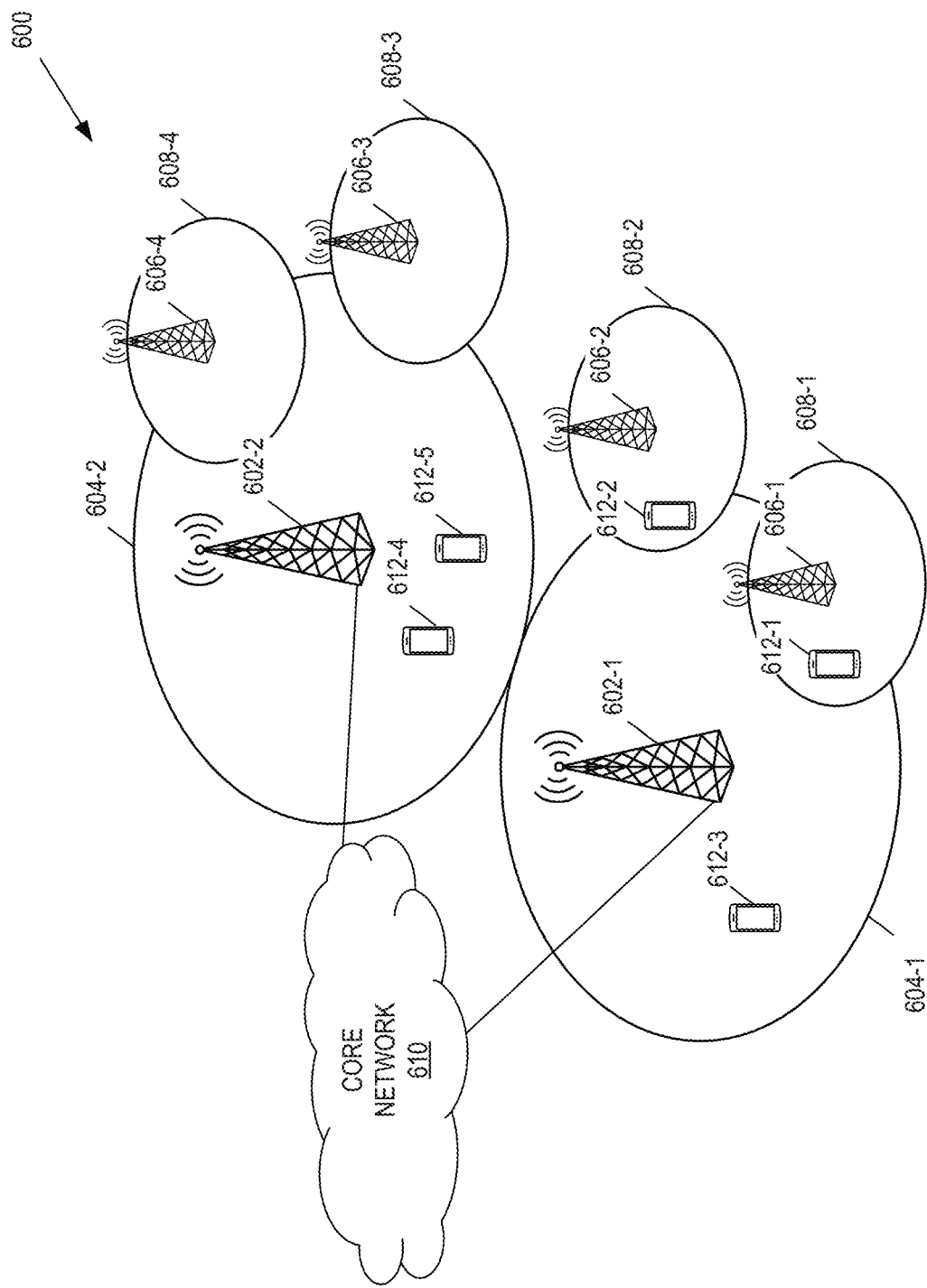
FIG. 6 illustrates one example of a cellular communications network according to some embodiments of the present disclosure.

FIG. 6 illustrates one example of a cellular communications network 600 according to some embodiments of the present disclosure. In the embodiments described herein, the cellular communications network 600 is a 5G NR network. In this example, the cellular communications network 600 includes base stations 602-1 and 602-2, which in LTE are referred to as eNBs and in 5G NR are referred to as gNBs, controlling corresponding macro cells 604-1 and 604-2. The base stations 602-1 and 602-2 are generally referred to herein collectively as base stations 602 and individually as base station 602. Likewise, the macro cells 604-1 and 604-2 are generally referred to herein collectively as macro cells 604 and individually as macro cell 604. The cellular communications network 600 may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The base stations 602 (and optionally the low power nodes 606) are connected to a core network 610.

The base stations 602 and the low power nodes 606 provide service to wireless devices 612-1 through 612-5 in the corresponding cells 604 and 608. The wireless devices 612-1 through 612-5 are generally referred to herein collectively as wireless devices 612 and individually as wireless device 612. The wireless devices 612 are also sometimes referred to herein as UEs.

Figure 7:
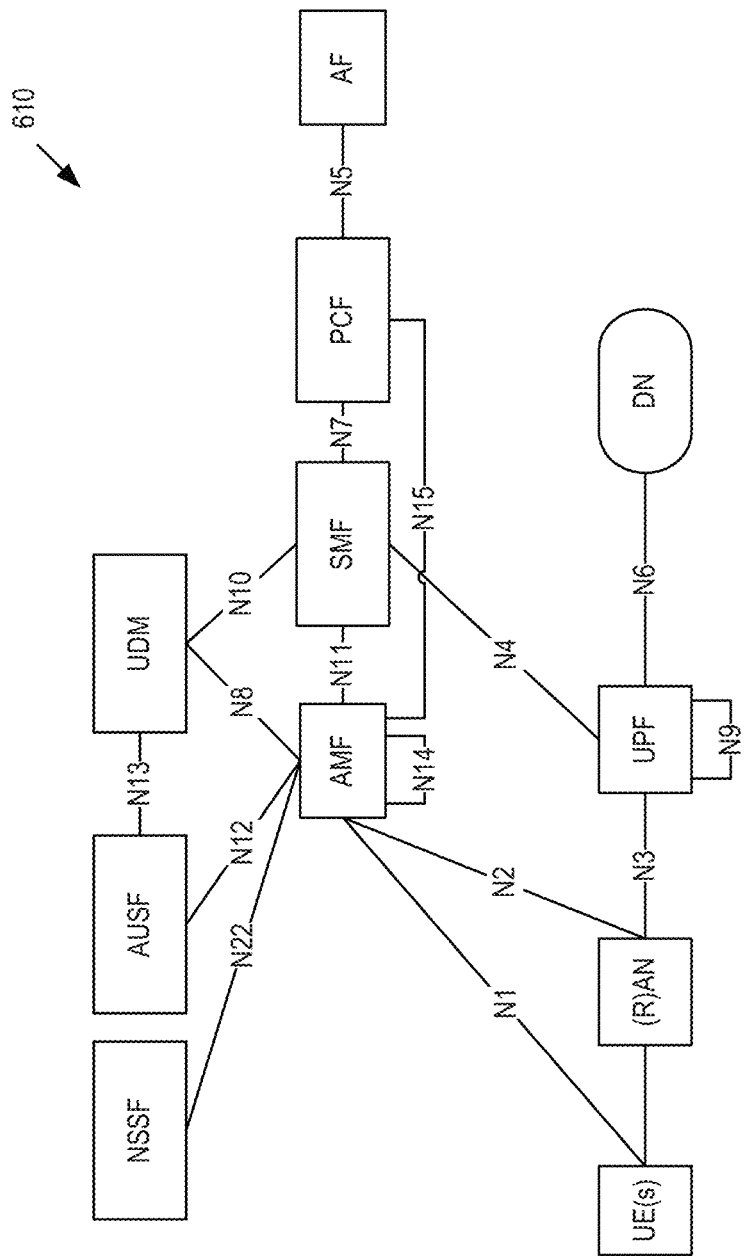
FIG. 7 illustrates a wireless communication system represented as a 5G network architecture composed of core Network Functions (NFs), where interaction between any two NFs is represented by a point-to-point reference point/interface.

FIG. 7 illustrates a wireless communication system represented as a 5G network architecture composed of core Network Functions (NFs), where interaction between any two NFs is represented by a point-to-point reference point/interface. FIG. 7 can be viewed as one particular implementation of the system 600 of FIG. 6.

Seen from the access side the 5G network architecture shown in FIG. 7 comprises a plurality of UEs connected to either a RAN or an Access Network (AN) as well as an AMF. Typically, the (R)AN comprises base stations, e.g., such as eNBs or gNBs or similar. Seen from the core network side, the 5G core NFs shown in FIG. 7 include a NSSF, an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to connect (i.e., carry signaling between) the UE and the AMF. The N2 reference point connects the (R)AN and the AMF. The N3 reference point connects the (R)AN and the UPF. The N4 reference point is used by the SMF and the UPF so that the UPF can be set using the control signal generated by the SMF, and so that the UPF can report its state to the SMF. The N5 reference point connects the PCF and an AF. The N6 reference point connects the UPF and a DN. The N7 reference point is used by the PCF to apply policy to the SMF. The N8 reference point is used to communicate subscription data of the UE to the AMF. The N9 reference point connects different UPFs. The N10 reference point is used to communicate subscription data of the UE to the SMF. The N11 reference point connects the AMF and SMF, which implies that the SMF is at least partly controlled by the AMF. The N12 reference point is used by the AMF to perform authentication of the UE. The N13 reference point connects the AUSF and the UDM. The N14 reference point connects different AMFs. The reference point N15 is used by the PCF to apply policy to the AMF.

The 5G core network aims at separating user plane and control plane. The user plane carries user traffic while the control plane carries signaling in the network. In FIG. 7, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 7. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 8:
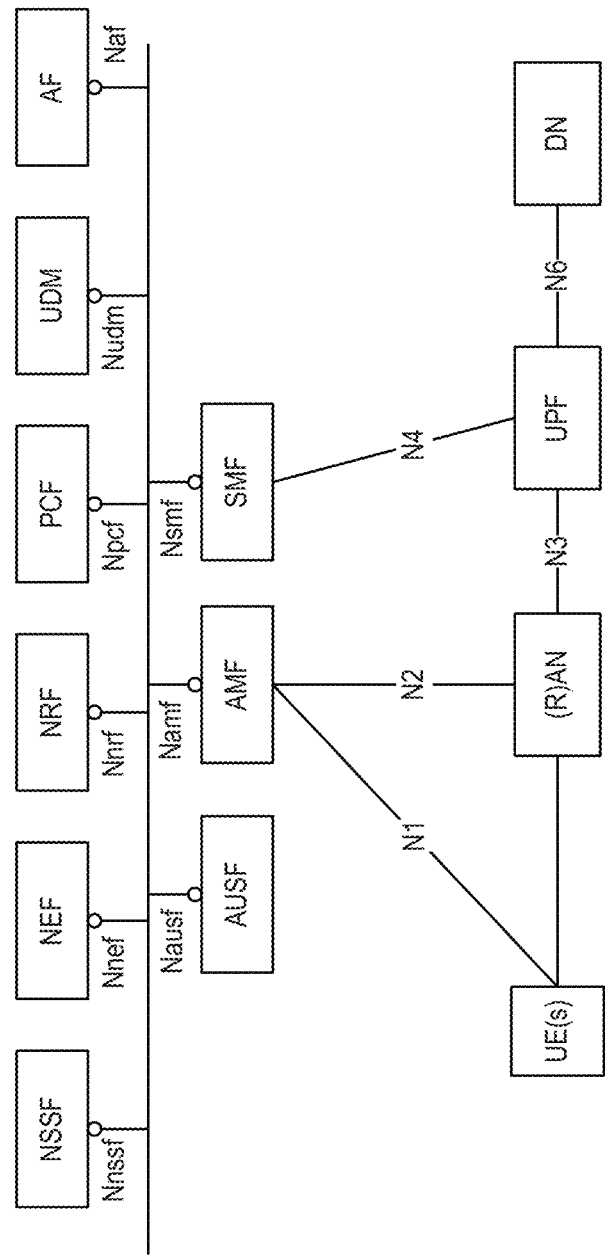
FIG. 8 illustrates a 5G network architecture using service-based interfaces between the NFs in the control plane.

FIG. 8 illustrates a 5G network architecture using service-based interfaces between the NFs in the control plane, instead of the point-to-point reference points/interfaces used in the 5G network architecture of FIG. 7. However, the NFs described above with reference to FIG. 7 correspond to the NFs shown in FIG. 8. The service(s) etc. that a NF provides to other authorized NFs can be exposed to the authorized NFs through the service-based interface. In FIG. 8 the service based interfaces are indicated by the letter "N" followed by the name of the NF, e.g., Namf for the service based interface of the AMF and Nsmf for the service based interface of the SMF etc. The NEF and the Network Repository Function (NRF) in FIG. 8 are not shown in FIG. 7 discussed above. However, it should be clarified that all NFs depicted in FIG. 7 can interact with the NEF and the NRF of FIG. 8 as necessary, though not explicitly indicated in FIG. 7.

Some properties of the NFs shown in FIGS. 7 and 8 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support QoS. Based on the information, the PCF determines policies about mobility and session management to make the AMF and SMF operate properly. The AUSF supports authentication function for UEs or similar and thus stores data for authentication of UEs or similar while the UDM stores subscription data of the UE. The DN, not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 9:
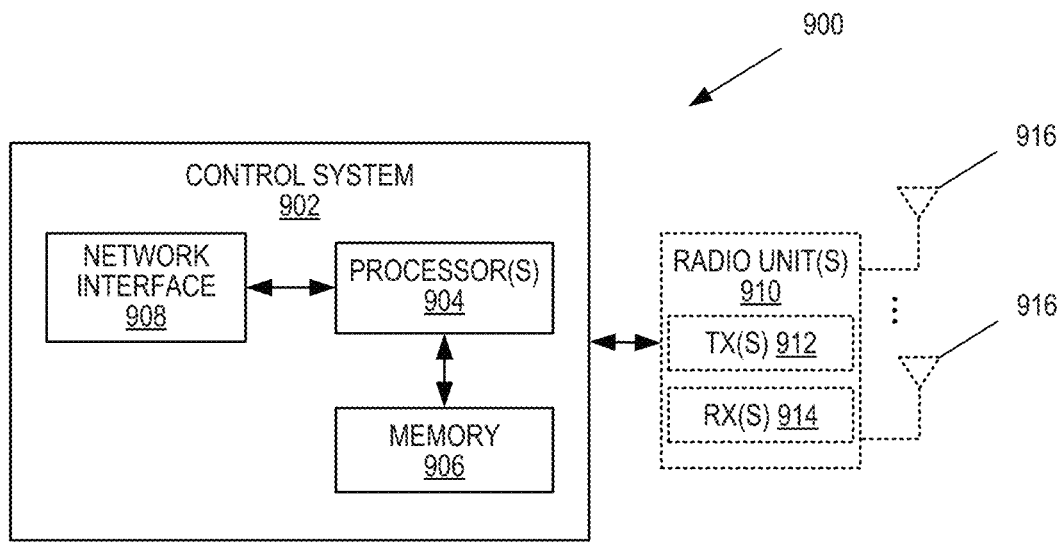
FIG. 9 is a schematic block diagram of a radio access node according to some embodiments of the present disclosure.

FIG. 9 is a schematic block diagram of a network node 900 according to some embodiments of the present disclosure. The network node 900 may be, for example, a base station 602 or 606. As illustrated, the network node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, if the network node 900 is a radio network node, for example, the network node 900 may also include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a network node 900 as described herein. In some embodiments, the function(s) are implemented in software that is stored, e.g., in the memory 906 and executed by the one or more processors 904.

Figure 10:
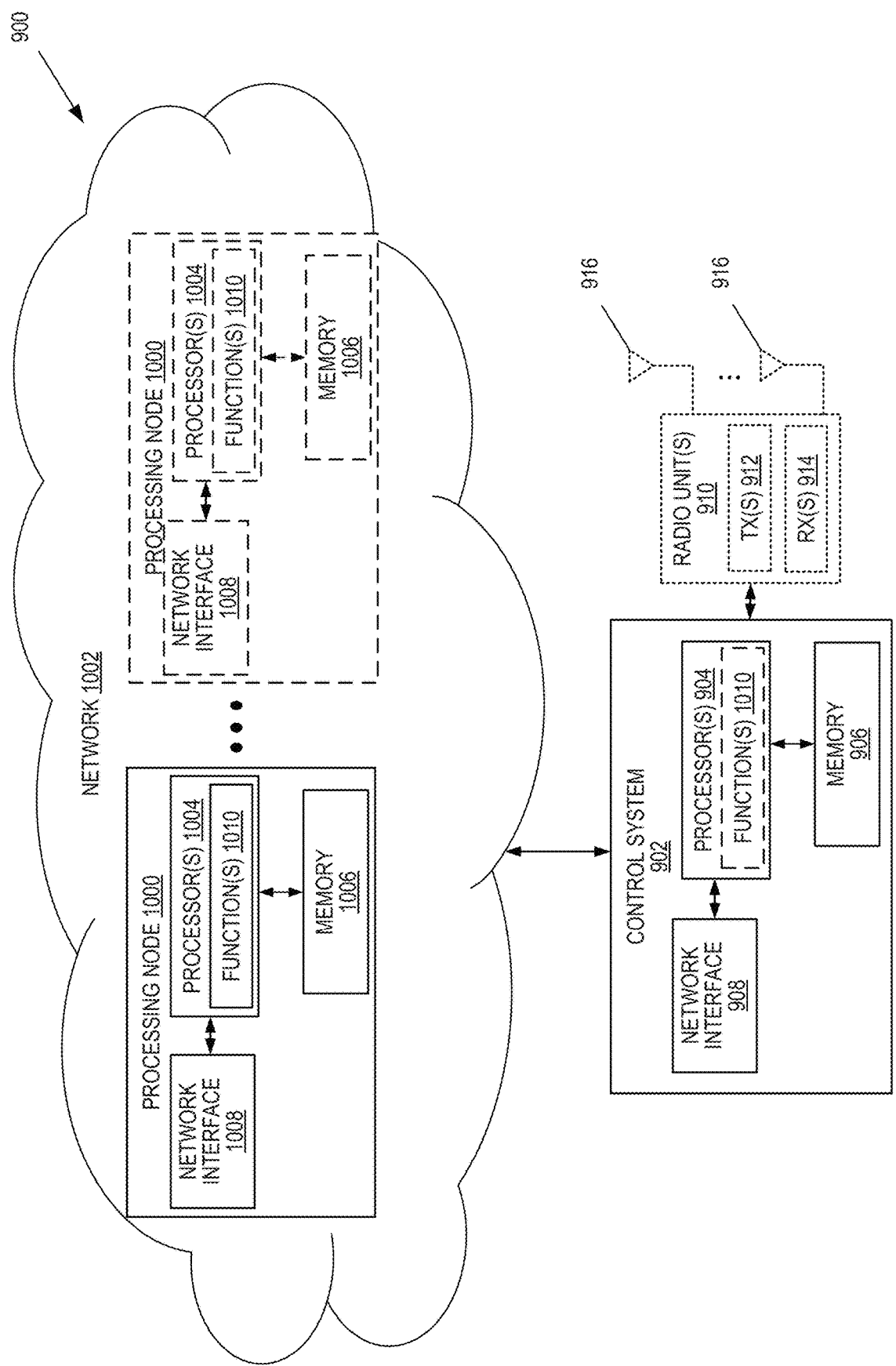
FIG. 10 is a schematic block diagram that illustrates a virtualized embodiment of the radio access node of FIG. 9 according to some embodiments of the present disclosure.

FIG. 10 is a schematic block diagram that illustrates a virtualized embodiment of the network node 900 according to some embodiments of the present disclosure. This discussion is equally applicable to other types of network nodes. Further, other types of network nodes may have similar virtualized architectures.

As used herein, a "virtualized" radio access node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 includes the control system 902 that includes the one or more processors 904 (e.g., CPUs, ASICs, FPGAs, and/or the like), the memory 906, and the network interface 908. The network node 900 may include one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the network node 900 described herein are implemented at the one or more processing nodes 1000 or distributed across the control system 902 and the one or more processing nodes 1000 in any desired manner. In some particular embodiments, some or all of the functions 1010 of the network node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of network node 900 or a node (e.g., a processing node 1000) implementing one or more of the functions 1010 of the network node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
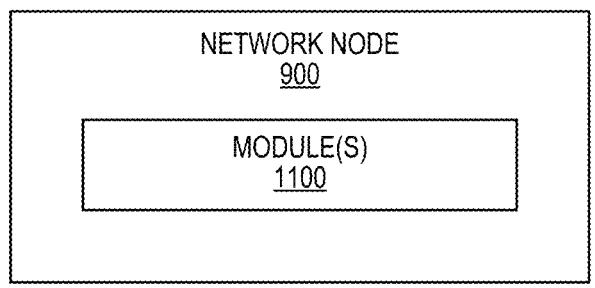
FIG. 11 is a schematic block diagram of the radio access node of FIG. 9 according to some other embodiments of the present disclosure.

FIG. 11 is a schematic block diagram of the network node 900 according to some other embodiments of the present disclosure. The network node 900 includes one or more modules 1100, each of which is implemented in software. The module(s) 1100 provide the functionality of the network node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
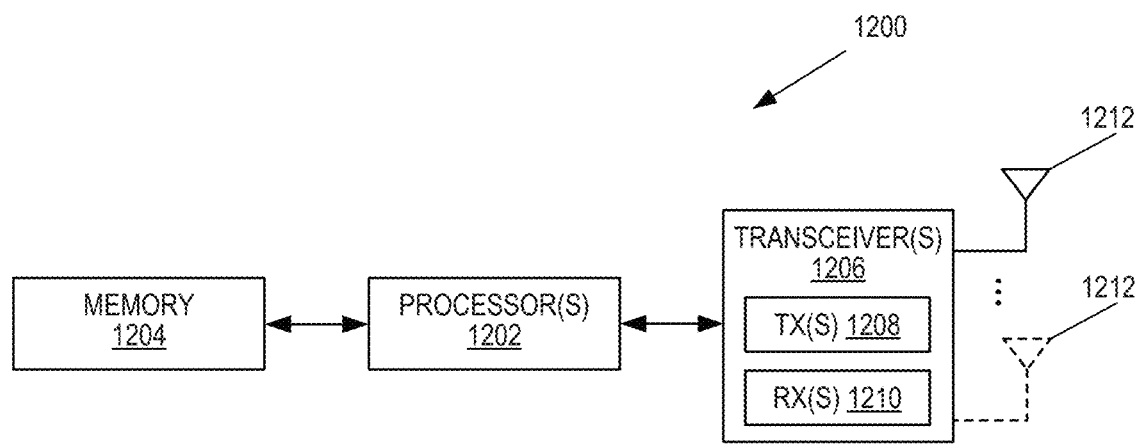
FIG. 12 is a schematic block diagram of a UE according to some embodiments of the present disclosure.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the UE 1200 described above may be fully or partially implemented in software that is, e.g., stored in the memory 1204 and executed by the processor(s) 1202. Note that the UE 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the UE 1200 and/or allowing output of information from the UE 1200), a power supply (e.g., a battery and associated power circuitry), etc.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
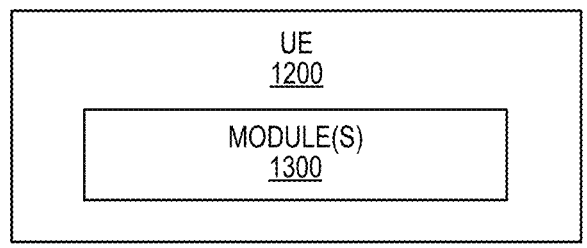
FIG. 13 is a schematic block diagram of the UE of FIG. 12 according to some other embodiments of the present disclosure.

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Figure 14:
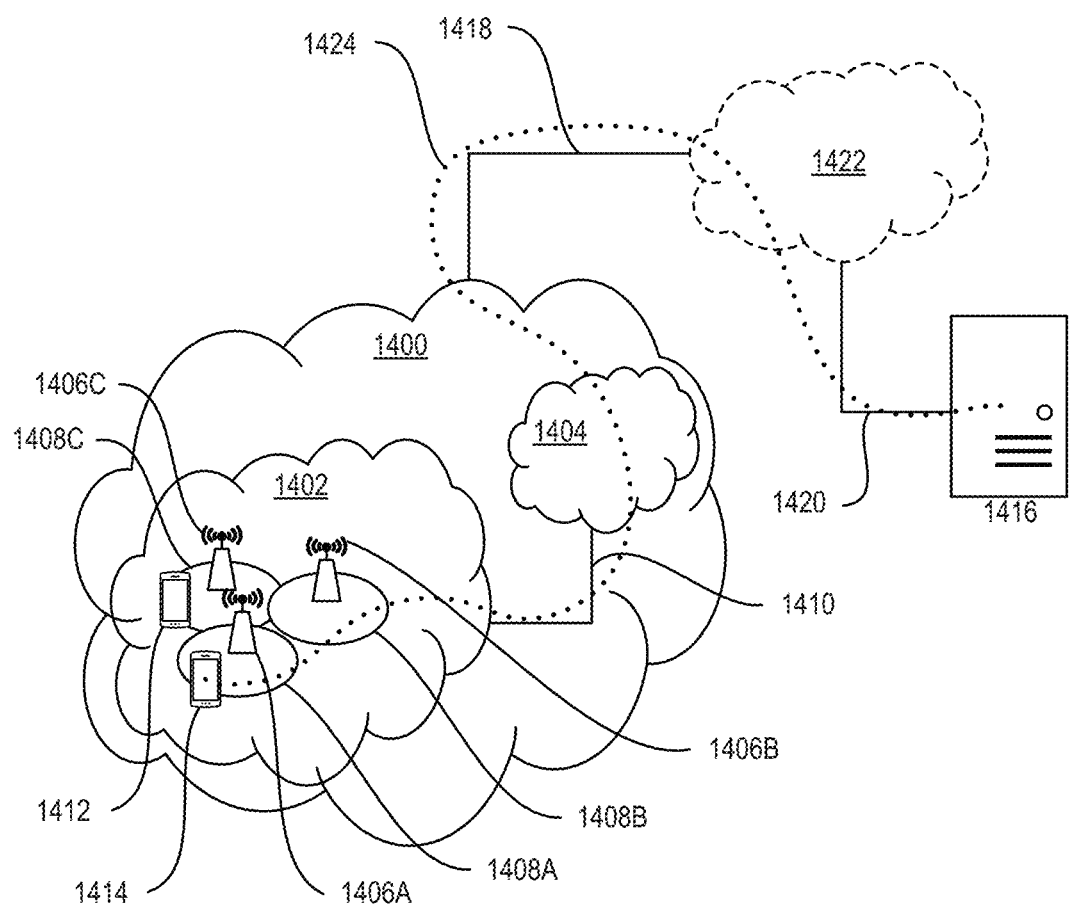
FIG. 14 illustrates a telecommunication network connected via an intermediate network to a host computer in accordance with some embodiments of the present disclosure.

FIG. 14 illustrates a telecommunication network connected via an intermediate network to a host computer in accordance with some embodiments of the present disclosure. In the embodiment illustrated in FIG. 14, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as NBs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Figure 15:
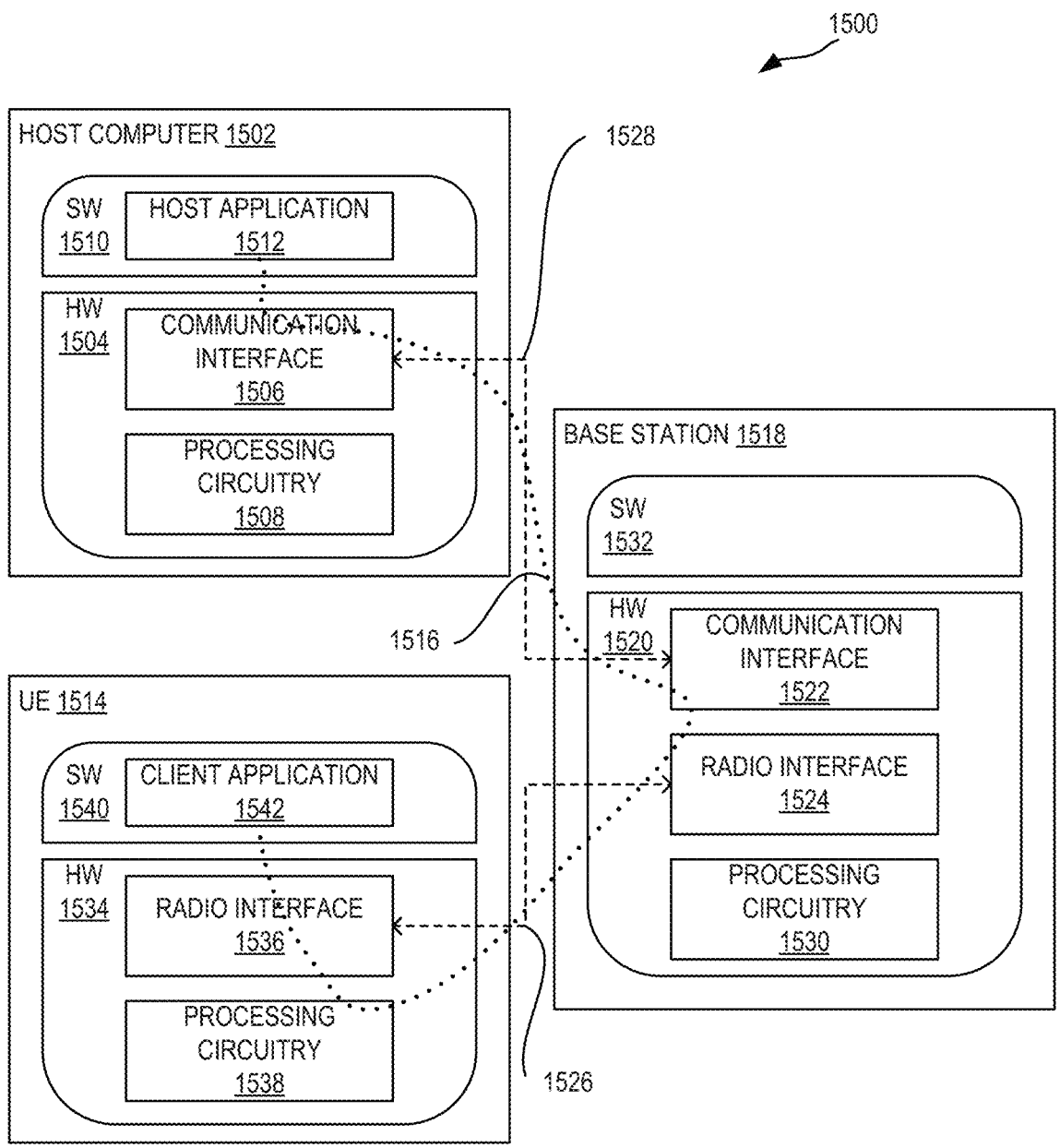
FIG. 15 is a generalized block diagram of a host computer communicating via a base station with a UE over a partially wireless connection in accordance with some embodiments of the present disclosure.

FIG. 15 is a generalized block diagram of a host computer communicating via a base station with a UE over a partially wireless connection in accordance with some embodiments of the present disclosure. Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure.

One or more of the various embodiments improve the performance of OTT services provided to the UE 1514 using the OTT connection 1516, in which the wireless connection 1526 forms the last segment. More precisely, the teachings of these embodiments provide 3PP information, such as future UE locations, to network analytics functions and thereby provide benefits such as improving network automation functions' ability to improve QoS or other aspects of the user experience along a mobile trajectory.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer's 1502 measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Figures 16, 17:
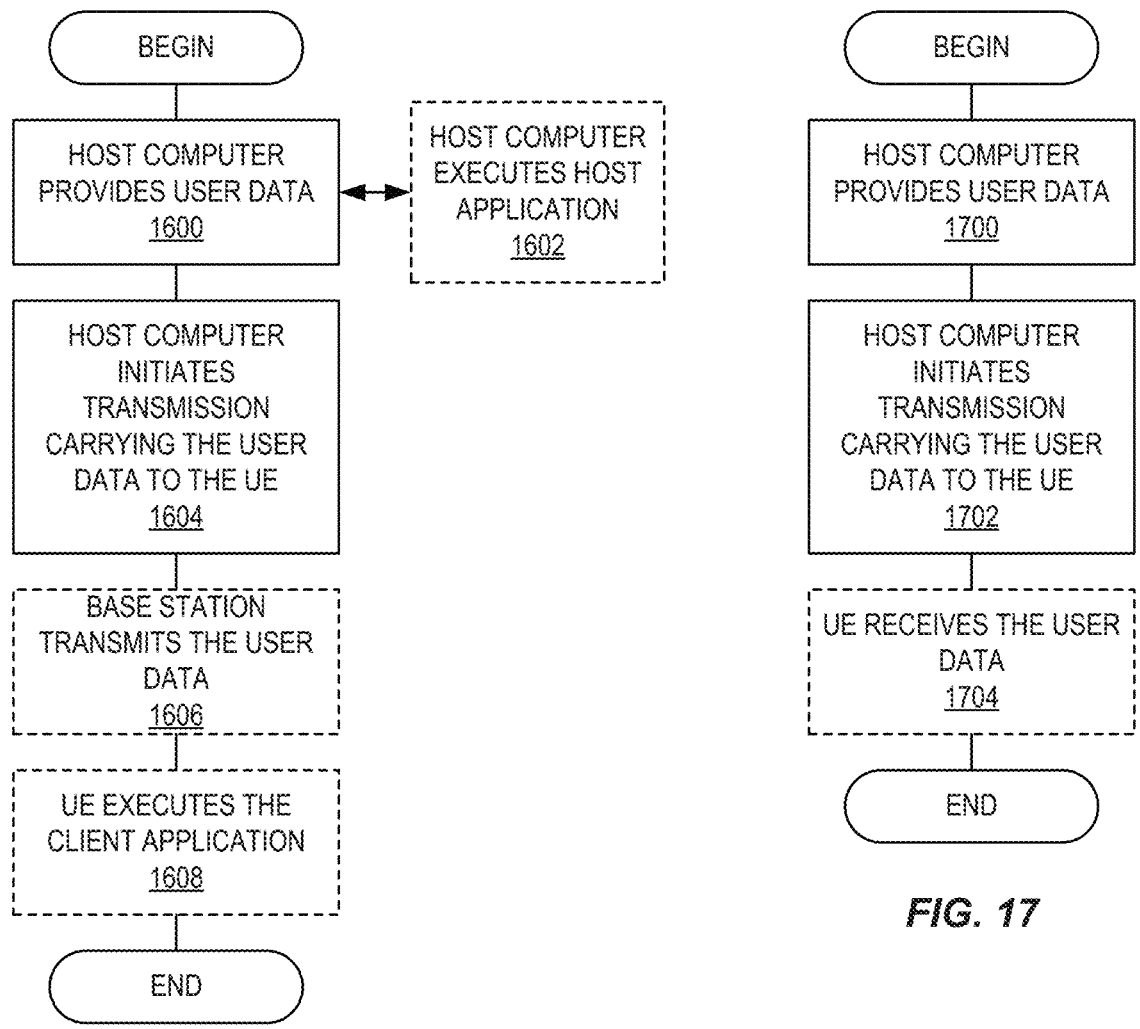
FIG. 16 is a flowchart illustrating a method implemented in a communication system in accordance with one embodiment of the present disclosure.
FIG. 17 is a flowchart illustrating a method implemented in a communication system in accordance with one embodiment of the present disclosure.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2G Second Generation
3D Three Dimensional
3G Third Generation
3GPP Third Generation Partnership Project
3PP Third Party Provider
4G Fourth Generation
5G Fifth Generation
5GC Fifth Generation Core network
5GS Fifth Generation System
A2G Aerial-to-Ground
AF Application Function
AMF Core Access and Mobility Management Function
AN Access Network
AP Access Point
API Application Programming Interface
ASIC Application Specific Integrated Circuit
AUSF Authentication Server Function
CN Core Network
CP Control Plane
CPU Central Processing Unit
DL Downlink
DN Data Network
DSP Digital Signal Processor
E2E End-to-End
eNB Enhanced or Evolved Node B
EPC Enhanced Packet Core
EPS Evolved Packet System
ETA Estimated Time of Arrival
FPGA Field Programmable Gate Array
FRAP Flying Radio Access Point
GIS Geographic Information System
gNB New Radio Base Station
ID Identity/Identifier
IoT Internet of Things
IP Internet Protocol
ITS Intelligent Traffic System
LTE Long Term Evolution
MIMO Multiple Input Multiple Output
ML Machine Learning
MME Mobility Management Entity
MMO Mobility Management and Optimization
MOS Mean Opinion Score
MTC Machine Type Communication
NAS Non-Access Stratum
NB Narrowband
NEF Network Exposure Function
NF Network Function
NG Next Generation
NR New Radio
NRAP Nomadic Radio Access Point
NRF Network Function Repository Function
NSSF Network Slice Selection Function
NWDA Network Data Analytics
NWDAF Network Data Analytics Function
O&M Operation and Maintenance
OAM Operations, Administration, and Maintenance
OTT Over-the-Top
PCF Policy Control Function
P-GW Packet Data Network Gateway
PLMN Public Land Mobile Network
QoS Quality of Service
RAM Random Access Memory
RAN Radio Access Network
RAT Radio Access Technology
REST Representational State Transfer
ROM Read Only Memory
RRH Remote Radio Head
RTT Round Trip Time
SBA Service Based Architecture
SCEF Service Capability Exposure Function
SDN Software Defined Network
SD-WAN Software Defined Network in a Wide-Area Network
SLA Service Level Agreement
SMF Session Management Function
TR Technical Report
TS Technical Specification
UAV Unmanned Aerial Vehicle
UDM Unified Data Management
UE User Equipment
UL Uplink
UP User Plane
UPF User Plane Function
URLLC Ultra-Reliable Low-Latency Communication
V2X Vehicle-to-Everything
WAN Wide Area Network Those skilled in the art will recognize improvements and modifications to the embodiments of the present disclosure. All such improvements and modifications are considered within the scope of the concepts disclosed herein.

The invention claimed is:

1. A method, performed in a network node within a telecommunications network, for End-to-End, E2E, User Equipment, UE, trajectory network automation, the method comprising:
    receiving, from a requesting entity, information identifying a future E2E UE trajectory, the identified future E2E UE trajectory comprising a start location, an end location, and zero or more intermediate locations between the start location and the end location;
    calculating an E2E mobility trajectory prediction for the identified future E2E UE trajectory and for at least one alternative E2E UE trajectory, wherein the E2E mobility trajectory prediction comprises a predicted UE experience for the identified future E2E UE trajectory and another predicted UE experience for the at least one alternative E2E UE trajectory, each predicted UE experience including a cost for a corresponding E2E UE trajectory; and
    sending, to the requesting entity, the calculated E2E mobility trajectory predictions for the identified future E2E UE trajectory and the at least one alternative E2E UE trajectory, from which the requesting entity will select an E2E UE trajectory.

2. The method of claim 1 wherein the network node comprises at least one of:
    a Network Data Analytics Function, NWDAF; and
    a Policy Control Function, PCF.

3. The method of claim 1 wherein the requesting entity comprises an untrusted application function.

4. The method of claim 3 wherein the request from the requesting entity is received from a Network Exposure Function, NEF, or a Service Capability Exposure Function, SCEF.

5. The method of claim 1 wherein the requesting entity comprises an application hosted by a UE.

6. The method of claim 5 wherein the request from the requesting entity is received from a User Plane Function, UPF.

7. The method of claim 1 wherein receiving the information identifying a future E2E UE trajectory comprises receiving information comprising network slice characteristics.

8. The method of claim 7 wherein the network slice characteristics comprise:
   an expected average downlink throughput per step or turn;
   an expected average downlink throughput during the stops;
   an expected average uplink throughput per step or turn;
   an expected average uplink throughput during the stops;
   an expected average latency per step or turn;
   an expected average latency during the stops;
   an expected average jitter per step or turn;
   an expected average jitter during the stops;
   an expected average reliability;
   an expected cost of tolls; and/or
   an expected cost per bit.

9. The method of claim 1 wherein receiving a start location comprises receiving:
   an estimated time to start;
   a latitude or equivalent;
   a longitude or equivalent; and/or
   an altitude or equivalent.

10. The method of claim 1 wherein receiving an end location comprises receiving:
    a latitude or equivalent;
    a longitude or equivalent; and/or
    an altitude or equivalent.

11. The method of claim 1 wherein receiving zero or more intermediate locations comprises receiving one or more stops or proposed turns.

12. The method of claim 11 wherein receiving a stop comprises receiving:
    an estimated stop time;
    a latitude or equivalent;
    a longitude or equivalent; and/or
    an altitude or equivalent.

13. The method of claim 11 wherein receiving a proposed turn comprises receiving:
    a new heading or change of direction;
    a latitude or equivalent;
    a longitude or equivalent; and/or
    an altitude or equivalent.

14. The method of claim 13 wherein a new heading or change of direction comprises an indication of right, left, up, down, or back.

15. The method of claim 1 wherein the predicted UE experience for the identified future E2E UE trajectory comprises:
    an identifier of the proposed route;
    an estimated time of arrival of the proposed route;
    an expected average downlink throughput per step or turn;
    an expected average downlink throughput during the stops;
    an expected average uplink throughput per step or turn;
    an expected average uplink throughput during the stops;
    an expected average latency per step or turn;
    an expected average latency during the stops;
    an expected average jitter per step or turn;
    an expected average jitter during the stops;
    an expected average reliability;
    an expected cost of tolls; and/or
    an expected cost per bit.

16. The method of claim 1 wherein the predicted UE experience for the at least one alternative E2E UE trajectory comprises:
    an identifier of the proposed route;
    an estimated time of arrival of the proposed route;
    an expected average downlink throughput per step or turn;
    an expected average downlink throughput during the stops;
    an expected average uplink throughput per step or turn;
    an expected average uplink throughput during the stops;
    an expected average latency per step or turn;
    an expected average latency during the stops;
    an expected average jitter per step or turn;
    an expected average jitter during the stops;
    an expected average reliability;
    an expected cost of tolls; and/or
    an expected cost per bit.

17. The method of claim 1, further comprising:
    receiving, from the requesting entity, information identifying a selected E2E UE trajectory; and
    adjusting the telecommunications network based on the selected E2E UE trajectory, wherein adjusting the telecommunications network comprises at least one of:
        sending mobility management and optimization information to a Radio Access Network, RAN; and
        adjusting the telecommunications network to deliver the predicted UE experience of the selected E2E UE trajectory.

18. The method of claim 17 wherein receiving the information identifying the selected E2E UE trajectory comprises receiving information identifying a selected route.

19. The method of claim 17 wherein sending the mobility management and optimization information to the RAN comprises sending the mobility management and optimization information to a Next Generation, NG, RAN.

20. The method of claim 17 wherein sending the mobility management and optimization information to the RAN comprises sending the mobility management and optimization information directly to the RAN.

21. The method of claim 17 wherein sending the mobility management and optimization information to the RAN comprises sending the mobility management and optimization information via one or more of:
    a Core Access and Mobility Management Function, AMF;
    an Operation and Maintenance, O&M, function; and
    a Network Slice Selection Function, NSSF.

22. The method of claim 1 wherein each E2E mobility trajectory prediction is calculated based on at least one of a current network configuration and a predicted network configuration.

23. A network node for End-to-End, E2E, User Equipment, UE, trajectory network automation, the network node comprising:
    one or more processors; and
    memory storing instructions executable by the one or more processors, whereby the network node is operable to:
        receive, from a requesting entity, information identifying a future E2E UE trajectory, the E2E UE trajectory comprising a start location, an end location, and zero or more intermediate locations between the start location and the end location;
        calculate an E2E mobility trajectory prediction for the identified future E2E UE trajectory and for at least one alternative E2E UE trajectory, wherein the E2E mobility trajectory prediction comprises a predicted UE experience for the identified future E2E UE trajectory and another predicted UE experience for the at least one alternative E2E UE trajectory, each predicted UE experience[M] including a cost for a corresponding E2E UE trajectory; and send, to the requesting entity, the calculated E2E mobility trajectory predictions for the identified future E2E UE trajectory and the at least one alternative E2E UE trajectory, from which the requesting entity will select an E2E UE trajectory.

24. The network node of claim 23, further operable to:

receive, from the requesting entity, information identifying a selected E2E UE trajectory; and adjust the telecommunications network based on the selected E2E UE trajectory, wherein adjusting the telecommunications network comprises at least one of:

sending mobility management and optimization information to a Radio Access Network, RAN; and adjusting the telecommunications network to deliver the predicted UE experience of the selected E2E UE trajectory.

25. The method of claim 23 wherein each E2E mobility trajectory prediction is calculated based on at least one of a current network configuration and a predicted network configuration.

26. A non-transitory computer readable medium storing software instructions that, when executed by one or more processors of a network node for End-to-End, E2E, User Equipment, UE, trajectory network automation, cause the network node to:

receive, from a requesting entity, information identifying a future E2E UE trajectory, the E2E UE trajectory comprising a start location, an end location, and zero or more intermediate locations between the start location and the end location;

calculate an E2E mobility trajectory prediction for the identified future E2E UE trajectory and for at least one alternative E2E UE trajectory, wherein the E2E mobility trajectory prediction comprises a predicted UE experience for the identified future E2E UE trajectory and another predicted UE experience for the at least one alternative E2E UE trajectory, each predicted UE experience including a cost for a corresponding E2E UE trajectory; and send, to the requesting entity, the calculated E2E mobility trajectory predictions for the identified future E2E UE trajectory and the at least one alternative E2E UE trajectory, from which the requesting entity will select an E2E UE trajectory;

receive, from the requesting entity, information identifying a selected E2E UE trajectory; and adjust the telecommunications network based on the selected E2E UE trajectory, wherein adjusting the telecommunications network comprises at least one of:

sending mobility management and optimization information to a Radio Access Network, RAN; and adjusting the telecommunications network to deliver the predicted UE experience of the selected E2E UE trajectory.

* * * * *